(12) United States Patent
Iwasaki

(10) Patent No.: US 7,187,834 B2
(45) Date of Patent: Mar. 6, 2007

(54) SHEET-SHAPED LIGHT GUIDE AND COMMUNICATION SYSTEM USING THE SAME

(75) Inventor: Osamu Iwasaki, Fujinomiya (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/044,037

(22) Filed: Jan. 28, 2005

(65) Prior Publication Data

US 2005/0201706 A1 Sep. 15, 2005

(30) Foreign Application Priority Data

Jan. 28, 2004 (JP) .............. 2004-019972

(51) Int. Cl.
*G02B 6/10* (2006.01)
*G02B 6/12* (2006.01)

(52) U.S. Cl. ....................... 385/129; 385/130

(58) Field of Classification Search ............. None
See application file for complete search history.

(56) References Cited

U.S. PATENT DOCUMENTS

| 5,542,017 | A | | 7/1996 | Koike |
| 5,548,670 | A | | 8/1996 | Koike |
| 5,822,475 | A | | 10/1998 | Hirota et al. |
| 6,215,936 | B1 | * | 4/2001 | Yoshikawa et al. ......... 385/133 |
| 6,594,430 | B1 | * | 7/2003 | Rausch et al. .............. 385/129 |
| 6,714,711 | B1 | * | 3/2004 | Lieberman et al. ......... 385/124 |
| 6,810,190 | B2 | * | 10/2004 | Manolatou ................... 385/129 |
| 6,859,574 | B2 | * | 2/2005 | Doerr et al. .................. 385/17 |
| 2004/0156590 | A1 | * | 8/2004 | Gunn et al. ................... 385/37 |
| 2005/0036737 | A1 | * | 2/2005 | Stuart .......................... 385/28 |

FOREIGN PATENT DOCUMENTS

JP          11-31035 A          2/1999

OTHER PUBLICATIONS

"High-Uniformity Star Coupler Using Diffused Light Transmission" IEICE Trans. Electron, vol. E84C, No. 3, Mar. 2001, p. 339.

\* cited by examiner

*Primary Examiner*—Sung Pak
(74) *Attorney, Agent, or Firm*—Sughrue Mion, PLLC

(57) ABSTRACT

In a sheet-shaped light guide (95), which includes particles for scattering light in a sheet-shaped optical medium and propagates signal light incident from one end face of the sheet-shaped light guide to the other end face side while scattering the signal light by the particles, a high-refractive-index portion 95*a* and a low-refractive-index portion 95*b* are formed by the use of a plurality of optical mediums whose refractive indexes are different from each other. Then, an interface between these high-refractive-index portion 95*a* and low-refractive index portion 95*b* is curved, and a lens effect for the signal light is imparted.

8 Claims, 27 Drawing Sheets

SHEET-SHAPED LIGHT GUIDE AND COMMUNICATION SYSTEM USING THE SAME

BACKGROUND OF THE INVENTION

1. Field of the Invention

The present invention relates to a sheet-shaped light guide, and particularly, to a sheet-shaped light guide which includes light-scattering particles in a sheet-shaped optical medium and propagates light incident from one end face of the light guide to the other end face side thereof while scattering the light by means of the particles.

Moreover, the present invention relates to a communication system using the sheet-shaped light guide.

2. Description of the Related Art

Heretofore, as described in, for example, U.S. Pat. Nos. 5,548,670 and 5,542,017, a light guide which includes particles for scattering light in an optical medium, such as PMMA (poly-methyl methacrylate), and which propagates light incident from one end face thereof to the other end face side thereof while scattering the light by means of the particles, is known.

Such a light guide propagates light by using the effect of total reflection at the interface between the side face of the light guide and a surrounding medium (air or cladding layer) while repeatedly scattering the light by means of the particles in the optical medium. Accordingly, when compared to a light guide which propagates light only by using the effect of total reflection, such a light guide has an advantage that it is possible to allow light, the intensity distribution of which is made even, to be emitted from an exit end face. As for this kind of a light guide, as described in, for example, U.S. Pat. No. 5,822,475, by utilizing such an advantage, it is conceived to apply the light guide in order to constitute an optical data bus (sheet bus). The optical data bus is formed by use of a sheet-shaped optical medium. One input part for inputting optical signals is coupled to one end face of the sheet-shaped optical medium, and a plurality of output parts are coupled to the other end face thereof. Therefore, the optical data bus distributes an inputted optical signal as a common signal to the plurality of output parts.

Moreover, as an optical data bus of this type, as described in, for example, Japanese Unexamined Patent Publication No. 11(1999)-031035, one, in which light diffusion portions are provided on a light-incident-side end portion of the sheet-shaped optical medium so as to correspond to respective signal light incident portions, and the signal light, which is diffused and branched by the light diffusion portions, is propagated toward a light-emitting-side end portion of the optical medium, is also known.

SUMMARY OF THE INVENTION

As described above, the sheet-shaped light guide including particles for scattering light in the sheet-shaped optical medium, which is as described in U.S. Pat. No. 5,822,475, has characteristics that light, the intensity of which is made even, is enabled to be emitted from an exit end face. It is an object of the present invention to enhance the characteristics much more.

Moreover, it is another object of the present invention to provide a communication system capable of obtaining good light emission efficiency and an even intensity distribution of emitted light by the use of the sheet-shaped light guide as described above. A sheet-shaped light guide according to the present invention, which, as described above, includes particles for scattering light in a sheet-shaped optical medium and propagates signal light incident from one end face of the sheet-shaped light guide to the other end face side while scattering the signal light by the particles, is characterized in that a plurality of optical mediums whose refractive indexes are different from each other are used as the optical medium, and an interface between the optical mediums curves, thereby having a concave lens effect for the signal light.

Note that, in the sheet-shaped light guide according to the present invention, it is preferable that the optical medium whose refractive index is higher form a concave shape toward the optical medium whose refractive index is lower, thus realizing the concave lens effect at the above interface.

Moreover, in the sheet-shaped light guide according to the present invention, the particles mixed into the optical medium may be non-magnetic conductive particles which behave according to the Mie scattering theory. Furthermore, the particles may be mixed into the optical medium with particle density enabled to have a gradient. Still further, it is also possible to form the sheet-shaped light guide by combining a plurality of the optical mediums.

Meanwhile, a communication system according to the present invention, which uses a sheet-shaped light guide, is that which uses the sheet-shaped light guide according to the present invention, wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less.

Note that, in the communication system using the sheet-shaped light guide according to the present invention, it is desirable that, when rms noise of the system is Noise(System_rms), an acceptable bit error rate is BER(accept), and a probability of occurrence of the Noise(System_rms) is Pr(Noise(System_rms)), the communication system satisfies:

Pr(Noise(System_rms)·Q)≦BER(accept)

where Q is a proportionality constant.

Furthermore, in the communication system using the sheet-shaped light guide according to the present invention, it is desirable that, when rms noise of the system is Noise(System_rms), an arbitrary threshold value in binarization is V(Thresh), and a signal voltage outputted from a light receiver through a load resistor is S(PRmin)v, the communication system satisfies:

{S(PRmin)v−V(Thresh)}>Noise(System_rms)·Q.

Moreover, it is preferable that the sheet-shaped light guide used in the present invention be formed of an optical medium of a shape satisfying sin θs>1 when it is assumed that, in the sheet-shaped light guide, light incident thereonto is reflected repeatedly on respective faces other than incident and exit end faces according to Snell's Law, and when a refractive index of a surrounding medium is Ns, a refractive index of the optical medium as a base material is Nm, an incident angle is θm, and a refraction angle is θs, if Nm·sin θm=Ns·sin θs is established when the particles are not included.

Furthermore, the sheet-shaped light guide used in the present invention be formed of an optical medium of a shape satisfying sin θs<1 when it is assumed that, in the sheet-shaped light guide, a light beam emitted from at least one exit end face obeys Snell's Law in reflection and refraction thereof on the exit end face, and when a refractive index of a surrounding medium is Ns, a refractive index of the optical medium as a base material is Nm, an incident angle is θm, and a refraction angle is θs, if Nm·sin θm=Ns·sin θs is established when the particles are not included.

When the concave lens effect is imparted to the sheet-shaped light guide, the signal light which propagates therethrough is diffused by the concave lens effect, and accordingly, it is made possible to make the intensity distribution of the light emitted therefrom more highly even in comparison with the case of only scattering the light by the above-described particles.

Incidentally, in the above described U.S. Pat. Nos. 5,548,670 and 5,542,017, a light guide for realizing a desired light intensity distribution by means of heterogeneous refractive index structure or by mixing and dispersing dielectric particles into an optical medium is proposed. In the U.S. Pat. Nos. 5,548,670 and 5,542,017, it is also described that strengthening scattered light intensity and making light intensity distribution at the exit opening even can be realized by applying the Debye's turbidity theory (Journal of Applied Physics Vol. 20 pp. 518–525 (1949)). Debye particularly refers to the discussion about scattered light written in "A theory about thermal fluctuation of a dielectric constant in gas or liquid" (Annalen Der Physik 33 pp. 1275–1298 (1910)) by Einstein. The equation of Einstein described in the above paper is as follows.

$$i/Io=(RT/N)\cdot\{(\epsilon-1)^2(\epsilon+2)^2/P\}\cdot(2\pi/\lambda)^4\{V/(4\pi D)^2\}\cos^2\theta \quad (1)$$

i: light intensity at a position apart from a scattering body by a distance of D
Io: incident light intensity
R: gas constant
T: absolute temperature
N: number of molecules in a gram molecule
ϵ: square of a refractive index at a wavelength of λ (dielectric constant)
P: pressure applied to a fluid
λ: wavelength
V: volume of a light scattering body
D: distance from the light scattering body to an observation point
θ: scattering angle This equation of Einstein is transformed by Debye to be expressed as follows.

$$i/I=<\eta>^2/\epsilon^2(\pi^2 V/\lambda^4 R^2)\cdot(1+\cos^2\theta)/2\cdot\omega \quad (2)$$

i: light intensity at a position apart from a scattering body by a distance of D
Io: incident light intensity
ϵ: dielectric constant of the scattering body
<η>²: mean square value of dielectric constant fluctuation of the scattering body
R: distance from the observation point to the scattering body
λ: wavelength
V: total volume of the light scattering body
θ: scattering angle
ω: correlation volume $$\omega=4\pi\int \sin(ksr)/ksr\cdot r^2\gamma(r)dr \quad (3)$$

k: wave number
s: length of a resultant vector of a unit vector of the incident light and a unit vector of an emitted light (s=2 sin(θ/2))
r: distance between two points in each of which fluctuation of a dielectric constant occurs According to Debye, the correlation volume c) can be integrated by designating γ(r) as follows:

$$\gamma(r)=\exp(-r/a) \text{ (a: correlation distance)}$$

Thus, equation (3) is expressed as follows:

$$\omega=8\pi a^3/(1+k^2s^2a^2)^2 \quad (4)$$

From equations (2) and (4), the following equation can be obtained.

$$i/I=<\eta>^2/\epsilon^2(\pi^2 V/\lambda^4 R^2)\cdot(1+\cos^2\theta)/2\cdot 8\pi a^3/(1+k^2s^2a^2)^2$$

Here, by using s=2 sin(θ/2), equation (2) can be expressed as follows:

$$i/I=4\pi a^3<\eta>^2/\epsilon^2(\pi^2 V/\lambda^4 R^2)\cdot(1+\cos^2\theta)/(1+8\pi^2(1-\cos\theta)(a/\lambda)^2)^2 \quad (5)$$

The term of the intensity as a function of the scattering angle is expressed as below.

$$f(\theta)=(1+\cos^2\theta)/(1+8\pi^2(1-\cos\theta)(a/\lambda)^2)^2 \quad (6)$$

The results of the normalized intensity versus scattering angle obtained by calculating this equation (6) with respect to each of typical values of (a/λ), are shown in FIG. 1. Moreover, the results of the normalized intensity versus scattering angle with respect to each of typical values of particle diameters Dp obtained on the basis of the Mie scattering theory, are shown in FIG. 2.

According to U.S. Pat. Nos. 5,548,670 and 5,542,017, it is conceivable that the particle diameter is approximately equal to the correlation distance. Therefore, from FIG. 1, it can be understood that, when the particle diameter is the same order as the wavelength, the intensity of the forward scatter light is strong, but when the particle diameter exceeds ten times of the wavelength, the side scatter light becomes very strong, and the light does not travel forward anymore. On the other hand, according to the Mie scattering theory, as apparent from FIG. 2, the intensity of the forward scatter light is still strong even when the particle diameter exceeds ten times of the wavelength. It can be found that, with the approximation of γ(r)=exp(−r/a), when the particle diameter is the same order as the wavelength, the Debye's turbidity theory gives a result similar to that of the Mie scattering theory, however, as for the particle diameter larger than this, the Debye's turbidity theory shows a large disagreement with the Mie scattering theory.

From the above discussion, it is conceivable that the Mie scattering theory is more suitable as a calculation method used for the purpose of causing incident light to be emitted with a homogeneous intensity distribution by mixing particles causing light scattering into a desired optical medium, the Mie's theory representing the Rayleigh scattering when the particle diameter is much smaller than the wavelength, and representing the Huygens-Fresnel diffraction when the particle diameter is much larger than the wavelength. Additionally, since the Mie scattering theory is for one-particle system, it is conceivable that, as for the scattering caused by multi-particles, an analysis in a multi-particle system based on the Mie scattering theory is required.

In manufacturing the sheet-shaped light guide used in the present invention, on the basis of the above discussion, a design condition for realizing desired light emission efficiency can be easily calculated. The method will be described in detail below.

<Scattering Cross Section>

First of all, a description will be given of a scattering cross section $\Phi$. Not only in the Mie scattering theory, the concept of the scattering cross section is widely used in a radiation region such as gamma rays or X rays and in a long wavelength region such as infrared rays or microwave in addition to the visible light region. When the relationship between the particle diameter and the wavelength is in the Rayleigh region, the scattering cross section $\Phi$ is expressed as follows:

$$\Phi = 128 \cdot \pi^5 \cdot (a_p^6 / 3\lambda^4) \cdot \{(n^2-1)/(n^2+2)\}^2 \quad (7)$$

$a_p$: particle radius
$\lambda$: incident light wavelength
n: relative refractive index On the other hand, in the Mie's theory, the scattering cross section $\Phi$ is expressed by the following equation (8).

$$\Phi = (\lambda^2 / 2\pi) \sum_{n=1}^{\infty} (2n+1) \cdot [|a_n|^2 + |b_n|^2] \quad (8)$$

$\lambda$: incident light wavelength $$a_n = \frac{\varphi_n(\alpha) \cdot \varphi'_n(\beta) - N \cdot \varphi_n(\beta) \cdot \varphi'_n(\alpha)}{\zeta_n(\alpha) \cdot \varphi'_n(\beta) - N \cdot \varphi_n(\beta) \cdot \zeta'_n(\alpha)}$$

$$b_n = \frac{N \cdot \varphi_n(\alpha) \cdot \varphi'_n(\beta) - \varphi_n(\alpha) \cdot \varphi'_n(\alpha)}{N \cdot \zeta_n(\alpha) \cdot \varphi'_n(\beta) - \varphi_n(\beta) \cdot \zeta'_n(\alpha)}$$

$\phi n(kr) = (\pi kr/2) \cdot Jn+1/2(kr)$
  $Jn+1/2(kr)$: Bessel function of the first kind
  k: wave number ($2\pi/\lambda$)
  r: radial component in polar coordinates
$\phi n'$: derivative of $\phi n$
$\zeta n(kr) = \phi n(kr) + i \cdot \chi n(kr)$
$\chi n(kr) = -(\pi kr/2) \cdot Nn+1/2(kr)$
  $Nn+1/2(kr)$: Neumann's Bessel function of the second kind
$\zeta n'$: derivative of $\zeta n$
$\alpha = 2\pi a/\lambda$
$\beta = N \cdot \alpha$ In the limit of $a/\lambda \gg 1$ of the above equation (8), the scattering cross section $\Phi$ is as follows:

$$\Phi = M\pi a_p^2 \text{ (when converging: M} \approx 2) \quad (9)$$

Moreover, in a range of $2\pi a_p/\lambda \approx 1$, it is known from equation (8) that the above M oscillates in a range of $1 < M < 6$.

Here, manners in which the M oscillates are shown in FIGS. 3A to 3C, when the relative refractive indexes n are 1.1, 1.5, and 2.1, respectively. From these figures, it can be understood that the scattering cross section $\Phi$ in the Mie scattering region oscillates and converges as the particle diameter Dp increases. Even in this oscillation region, the converging value, by which to multiply the geometric scattering cross section $\pi a_p^2$, in the Mie scattering region can be obtained in accordance with the respective particle diameters from FIGS. 3A to 3C across the wide relative-refraction-index n range of 1 to 2.

The results of the relationship between the particle diameter Dp and the scattering cross section $\Phi$, which are obtained with respect to each relative refraction index n on the basis of the above equations (7) and (9), are shown in FIG. 4. On the other hand, the results of the relationship between the particle diameter Dp in a multi-particle system and the reciprocal of the particle density multiplied by a numerical value, which are obtained by computer simulation on the basis of the Mie scattering theory, are shown in FIG. 5.

It should be noted that, in the computer simulation, it is assumed that light having a finite spread angle is made incident into an optical medium which includes particles therein and which has a cube shape having various sizes of 10 mm cubed to 1000 mm cubed. That is, the incident light and the size of the cube vary similarly. Moreover, the particle diameter Dp is varied in a wide range from the Rayleigh scattering region to the Fresnel diffraction region. Incidentally, it is assumed that the light is emitted in the same direction as that of the incident light from a position opposite to the incident side, and that the light emission efficiency at the light exit end of the cube is about 80%.

From these FIGS. 4 and 5, it can be understood that there is a close relationship between the scattering cross section and the number of particles in the optical medium having a finite size.

<Lambert-Beer Law and Scattering Cross Section>

From the Lambert-Beer law, the transmissivity T given when a parallel rays are incident onto an isotropic medium is expressed as follows:

$$T = I/Io = \exp(-\rho \cdot x) \quad (10)$$

x: distance
Io: incident light intensity
I: emitted light intensity
$\rho$: attenuation constant Assuming that the scattering cross section of a particle is $\Phi$ and the number of particles per unit volume included in the medium is Np, the above attenuation constant $\rho$ is thought to be:

$$\rho = \Phi \cdot Np \cdot K_C \quad (11)$$

Here, $K_C$ is a dimensionless correction coefficient which is empirically obtained when light propagates in an optical medium in a finite space.

The parameters generally required to design a light guide are the volume V of an optical medium, the number $N_{PT}$ of mixed particles, and the particle diameter Dp. Next, how the emitted light intensity varies in this case will be discussed.

Here, Np is expressed as $Np = N_{PT}/V$. Moreover, $K_C$ is determined from comparison or analogy between FIGS. 4 and 5, and from some data not illustrated. In the present computation, $K_C = 0.004$ is obtained from FIGS. 4 and 5, and from some data not illustrated. The particle diameter Dp and the scattering cross section $\Phi$ are related with each other via equations (7) and (9). Accordingly, assuming that the length of the optical medium in the optical axis direction is $L_G$, the light emission efficiency Eout is given by:

$$E\text{out} = \exp\{-(\Phi \cdot Np \cdot L_G \cdot K_C)\} \quad (13)$$

From equation (13), it is found that the emission efficiency can be made constant by setting $\Phi \cdot Np \cdot L_G = \text{const}$. In other words, this is achieved by changing Np in accordance with $L_G$ which is the length of the optical medium in the optical axis direction.

Furthermore, when expressed by using a loss coefficient $K_L$ which is obtained by aggregating the Fresnel loss, which depends on the shape of the cube, the intensity distribution of the incident light, and the incident angle when no particles exist, internal transmissivity, and the like, the above equation (13) becomes as follows:

$$E\text{out}=\exp\{-(\Phi \cdot Np \cdot L_G \cdot K_C)\} \cdot K_L \quad (14)$$

Specifically, the emission efficiency Eout can be determined from the scattering cross section $\Phi$ of a particle, the particle density Np, the length $L_G$ of the optical medium in the light propagation direction, the correction coefficient $K_C$, and the loss coefficient $K_L$. In other words, when a desired light emission efficiency Eout is given, the light emission efficiency Eout is realized by satisfying the above equation (14).

<Fresnel Loss Factor>

Giving attention to a reflectance in the first place, when a p-polarization component is Rp, and an s-polarization component is Rs, the Fresnel loss is expressed as follows:

$$Rp=\tan(\theta i-\theta r)/\tan(\theta i+\theta r) \quad (15a)$$

$$Rs=-\sin(\theta i-\theta r)/\sin(\theta i+\theta r) \quad (15b)$$

$\theta i$: incident angle
$\theta r$: refraction angle

Therefore, from equations (15a) and (15b), the reflected-light intensity Ir can be expressed as follows:

$$Ir=(Rp^2+Rs^2)/2 \quad (16)$$

From equation (16), the transmitted-light intensity It can be expressed as follows:

$$It=1-Ir \quad (17)$$

Assuming that the transmitted-light intensity in which the intensity distribution of the incident light is considered is denoted by It', equation (17) can be modified as follows:

$$It'(\theta i)=It(\theta i) \cdot D(\theta i) \quad (18)$$

$D(\theta i)$: intensity distribution function

<Calculation of Fresnel Loss>

When a light beam having an arbitrary spread angle is incident on an optical medium, the Fresnel loss varies in accordance with the arbitrary incident angle $\theta i$. Assuming that the maximum incident angle of the light beam is $\theta$max, the Fresnel loss at an interface is expressed as follows:

$$\int_0^{\theta_{max}} It(\theta i) \cdot D(\theta i) \, d\theta i \Big/ \int_0^{\theta_{max}} D(\theta i) \, d\theta i \quad (19)$$

Assuming that the intensity distribution of the incident light is rectangle for the purpose of simplifying the calculation, the above expression (19) becomes as follows:

$$\int_0^{\theta_{max}} It(\theta i) \, d\theta i \Big/ \int_0^{\theta_{max}} d(\theta i) \quad (20)$$

The results of the Fresnel loss, which are obtained with respect to each of various refraction indexes of the optical mediums on the basis of the expression (20), are shown in FIG. 6. It is noted that the loss is shown by plotting transmissivity on vertical axis. In other words, the transmissivity of 1 represents the loss of 0.

<Calculation of Light Emission Efficiency Including Fresnel Loss>

From FIG. 6, it can be understood that the Fresnel loss remains almost the same when the incident angle is 30 degrees or less, even when the refractive indexes of the optical medium and the surrounding medium are largely different from each other. When the optical medium is a sheet-shaped rectangular body, direction cosines of light beams are conserved in reflection and refraction, and the incident angle and the emission angle are the same when no particles exist. Additionally, when the internal transmissivity can be approximated as Tin≈1, the product of the transmissivity at the incident surface and the transmissivity at the exit surface is the total transmissivity Ttotal. Accordingly, assuming that the refractive index of the optical medium is n=1.5, the total transmissivity becomes Ttotal=0.92.

Therefore, equation (14) becomes as follows:

$$E\text{out}=\exp\{-(\Phi \cdot Np \cdot L_G \cdot K_C)\} \cdot 0.92 \quad (14b)$$

The results of the relationship between the particle diameter and the light emission efficiency, which are obtained by the use of equation (14b), are shown in FIGS. 7A to 7E. Incidentally, when there is an intensity distribution of the incident light, or when the incident angle of the incident light is 30 degrees or more, the Fresnel loss may be obtained by the use of the expressions (19) and (20) and substituted into equation (14b). However, at the exit of the light, it is desirable that the half angle of the spread angle of the incident light be about 30 degrees in consideration of the critical angle.

Regarding FIGS. 7A to 7E, firstly, light emission efficiencies as average targets are determined with respect to each particle diameter. FIGS. 7A to 7E show the results of the calculated values (10 mm(C), 100 mm(C), and 1000 mm(C)) obtained with respect to each particle diameter in the present calculation method and the precise simulations (S 10 mm, S 100 mm, and S1000 mm) performed under the conditions of the particle diameters and the particle densities which are used in the present calculation. The light emission efficiencies as average targets are 80%, 70%, 60%, 50%, and 40% in FIGS. 7A to 7E, respectively. The scattering cross section $\Phi$ was calculated according to the Rayleigh's theory when the particle diameter is 20 nm, and according to the Mie's theory when the particle diameter is 200 nm or more. "S" represents the simulation result, and "C" represents the present calculation result. Additionally, each of the above values is the length $L_G$ of the optical medium in the light propagation direction.

From FIGS. 7A to 7E, it can be understood that, when the light emission efficiencies as average targets are 60% or more, the results of the present calculations fall within errors of less than 10% of the precise simulation results, and well agree with those of the simulations. In other words, FIGS. 7A to 7E show that the errors are less than 10% when the value of $\Phi \cdot Np \cdot L_G \cdot K_C$ is 0.4 or less. Moreover, FIGS. 7A to 7E also show that the errors are less than 50% even when the above-described value is 0.9 or less. Note that, for the value of $K_L$, 0.92 which is an empirically obtained value is used.

In terms of performing a simulation or making a trial production, it is conceived that no particular problem occurs for the purpose of setting the targets for the light emission efficiencies even when the errors of approximately 50% occur. Needless to say, it is not necessary to perform the simulation when the errors are less than 10%. Moreover, it becomes unnecessary to evaluate several kinds of samples and choose therefrom. Accordingly, an effect that development efficiency is improved is obtained.

From the results described above, it is conceived that it is possible to obtain a prospective solution for the light emission efficiency by the use of equation (14) on the basis of the results in the Rayleigh region and the Mie scattering converging region, which are relatively simple, without relying on the complicated theory of the Mie scattering. The present method is created in consideration of this finding, and as described above, the desired light emission efficiency Eout is realized by satisfying the following equation:

$$E\text{out} = \exp\{-(\Phi \cdot Np \cdot L_G \cdot K_C)\} \cdot K_L$$

<Calculation Example>

Results of performing the calculation for the sheet-shaped rectangular body on the basis of equation (14) are shown in Tables 1 to 3 and FIGS. 8A to 8C. Note that FIG. 8A shows a graph of numerical values listed in Table 1, and in a similar way, Table 2 and Table 3 are corresponding to FIG. 8B and FIG. 8C, respectively. In the calculation results in these Tables, any of the values of $\Phi \cdot Np \cdot L_G \cdot K_C$ is 0.9 or less. Note that, in any of the cases, the value of $K_L$ is 0.92.

TABLE 1

Eout = 0.8

| Particle diameter (nm) | Scattering cross section ($m^2$) | Particle density (pieces/$mm^3$) | W × T × $L_G$ (mm) | Emission efficiency, Eq. (14) (%) | Emission efficiency, SIM (%) |
|---|---|---|---|---|---|
| 20 | $1.1 \times 10^{-22}$ | $1.0 \times 10^{13}$ | 4 × 1 × 20 | 84 | 87 |
|  |  | $2.5 \times 10^{12}$ | 16 × 1 × 80 |  | 88 |
|  |  | $6.3 \times 10^{11}$ | 64 × 1 × 320 |  | 88 |
| 200 | $1.5 \times 10^{-14}$ | $3.0 \times 10^{7}$ | 4 × 1 × 20 | 89 | 89 |
|  |  | $7.5 \times 10^{6}$ | 16 × 1 × 80 |  | 89 |
|  |  | $1.9 \times 10^{8}$ | 64 × 1 × 320 |  | 89 |
| 2,000 | $12.6 \times 10^{-12}$ | $3.0 \times 10^{5}$ | 4 × 1 × 20 | 68 | 75 |
|  |  | $7.5 \times 10^{4}$ | 16 × 1 × 80 |  | 76 |
|  |  | $1.9 \times 10^{4}$ | 64 × 1 × 320 |  | 76 |
| 20,000 | $6.3 \times 10^{-10}$ | $3.0 \times 10^{3}$ | 4 × 1 × 20 | 79 | 86 |
|  |  | $7.5 \times 10^{2}$ | 16 × 1 × 80 |  | 86 |
|  |  | $1.9 \times 10^{2}$ | 64 × 1 × 320 |  | 86 |
| 200,000 | $6.3 \times 10^{-8}$ | $3.0 \times 10^{1}$ | 4 × 1 × 20 | 79 | 90 |
|  |  | $7.5 \times 10^{0}$ | 16 × 1 × 80 |  | 90 |
|  |  | $1.9 \times 10^{0}$ | 64 × 1 × 320 |  | 90 |

Rectangular body (Sheet)
Note)
SIM: simulation

TABLE 2

Eout = 0.7

| Particle diameter (nm) | Scattering cross section ($m^2$) | Particle density (pieces/$mm^3$) | W × T × $L_G$ (mm) | Emission efficiency, Eq. (14) (%) | Emission efficiency, SIM (%) |
|---|---|---|---|---|---|
| 20 | $1.1 \times 10^{-22}$ | $2.0 \times 10^{13}$ | 4 × 1 × 20 | 78 | 82 |
|  |  | $5.0 \times 10^{13}$ | 16 × 1 × 80 |  | 83 |
|  |  | $1.3 \times 10^{12}$ | 64 × 1 × 320 |  | 83 |
| 200 | $1.5 \times 10^{-14}$ | $6.0 \times 10^{7}$ | 4 × 1 × 20 | 85 | 85 |
|  |  | $1.5 \times 10^{7}$ | 16 × 1 × 80 |  | 85 |
|  |  | $3.8 \times 10^{6}$ | 64 × 1 × 320 |  | 84 |
| 2,000 | $12.6 \times 10^{-12}$ | $4.5 \times 10^{5}$ | 4 × 1 × 20 | 59 | 65 |
|  |  | $1.1 \times 10^{5}$ | 16 × 1 × 80 |  | 65 |
|  |  | $2.8 \times 10^{4}$ | 64 × 1 × 320 |  | 58 |
| 20,000 | $6.3 \times 10^{-10}$ | $4.5 \times 10^{3}$ | 4 × 1 × 20 | 73 | 79 |
|  |  | $1.1 \times 10^{3}$ | 16 × 1 × 80 |  | 79 |
|  |  | $2.8 \times 10^{2}$ | 64 × 1 × 320 |  | 70 |
| 200,000 | $6.3 \times 10^{-8}$ | $4.5 \times 10^{1}$ | 4 × 1 × 20 | 73 | 86 |
|  |  | $1.1 \times 10^{1}$ | 16 × 1 × 80 |  | 86 |
|  |  | $2.8 \times 10^{0}$ | 64 × 1 × 320 |  | 78 |

Rectangular body (Sheet)
Note)
SIM: simulation

TABLE 3

Eout = 0.6

| Particle diameter (nm) | Scattering cross section (m²) | Particle density (pieces/mm³) | W × T × $L_G$ (mm) | Emission efficiency, Eq. (14) (%) | Emission efficiency, SIM (%) |
|---|---|---|---|---|---|
| 20 | $1.1 \times 10^{-22}$ | $3.2 \times 10^{13}$ | 4 × 1 × 20 | 70 | 78 |
|  |  | $8.0 \times 10^{12}$ | 16 × 1 × 80 |  | 79 |
|  |  | $2.0 \times 10^{12}$ | 64 × 1 × 320 |  | 79 |
| 200 | $1.5 \times 10^{-14}$ | $1.2 \times 10^{8}$ | 4 × 1 × 20 | 79 | 78 |
|  |  | $3.0 \times 10^{7}$ | 16 × 1 × 80 |  | 78 |
|  |  | $7.5 \times 10^{6}$ | 64 × 1 × 320 |  | 77 |
| 2,000 | $12.6 \times 10^{-12}$ | $9.0 \times 10^{5}$ | 4 × 1 × 20 | 37 | 41 |
|  |  | $2.3 \times 10^{5}$ | 16 × 1 × 80 |  | 40 |
|  |  | $5.6 \times 10^{4}$ | 64 × 1 × 320 |  | 36 |
| 20,000 | $6.3 \times 10^{-10}$ | $9.0 \times 10^{3}$ | 4 × 1 × 20 | 59 | 60 |
|  |  | $2.3 \times 10^{3}$ | 16 × 1 × 80 |  | 60 |
|  |  | $5.6 \times 10^{2}$ | 64 × 1 × 320 |  | 52 |
| 200,000 | $6.3 \times 10^{-8}$ | $9.0 \times 10^{1}$ | 4 × 1 × 20 | 59 | 73 |
|  |  | $2.3 \times 10^{1}$ | 16 × 1 × 80 |  | 73 |
|  |  | $5.6 \times 10^{0}$ | 64 × 1 × 320 |  | 64 |

Rectangular body (Sheet)
Note)
SIM: simulation

In FIGS. 8A to 8C, lines indicated by reference symbols (C) and (S) represent the results of this calculation and the precise simulation, respectively. Moreover, numerical values represent dimensions (mm) of each optical medium. Furthermore, the light emission efficiencies as the targets are set at the averages in the respective particle diameters. As apparent from Tables 1 to 3 and FIGS. 8A to 8C, it can be understood that the results of this calculation and the results of the simulation well agree with each other. In particular, the results in the particle diameter of 2,000 nm make it far clearer that the present calculation method agrees with the simulation.

<Distribution Characteristics of Emitted Light Intensity>

Distribution characteristics of emitted light intensity are affected by an intensity distribution of the light source, a spread angle, the number and location of the light sources and the like, and were therefore evaluated by the simulation. The distribution characteristics of the emitted light intensity for each particle diameter, which were thus obtained, are shown in FIGS. 9A to 9C. Here, the light source was assumed to be located at a center of an incident-side cross section of the optical medium, and the half angle of the spread angle was set at 30 degrees. FIGS. 9A to 9C show results of performing the simulations for the case of the sheet-shaped rectangular bodies under the same conditions as in Table 1, and show the results of the cases where sheet sizes thereof are small, medium and large, respectively.

From these graphs, it can be understood that substantially even intensity distributions are realized at approximately 90% of the light emission efficiency in the optical medium, cross sections of which are rectangular. From the above discussion and the computer simulation, when the light guide is manufactured by mixing the particles causing the light scattering into the arbitrary optical medium, first, on the basis of equation (14), the light emission efficiency can be chosen in advance from the scattering cross section, the particle density, the dimension of the optical medium and the like with respect to each particle diameter. Furthermore, the light intensity distribution characteristics may be obtained by the precise simulation. Alternatively, it is also possible to make several kinds of samples in accordance with the conditions chosen in advance on the basis of the expression (14), and to experimentally evaluate the samples.

Moreover, in the sheet-shaped light guide used in the present invention, since a configuration satisfying the relationship of $\Phi \cdot Np \cdot L_G \cdot K_C \leq 0.9$ as described above is adopted, the errors from the results of the simulation can be less than 10%. Therefore, good light emission efficiency and an even intensity distribution of the emitted light can be realized.

Moreover, since the sheet-shaped light guide used in the present invention propagates light therethrough while repeatedly scattering the light by the particles in the optical medium, both of the following are possible in a similar way: one is to make the light incident from one end face and to propagate the light to the other end face; and the other is to make the light incident from the above-described other end face and to propagate the light to the above-described one end face. Accordingly, it becomes possible for a communication system using the sheet-shaped light guide of the present invention to perform two-way communication.

<Necessary Condition of Communication System Using Sheet-shaped Light Guide>

A typical sheet-shaped light guide for communication is shown in FIG. 10. As described above, the sheet-shaped light guide 10 includes the light-scattering particles in the optical medium such as, for example, polymethylmethacrylate (PMMA), and propagates light incident from one end face to the other end face while scattering the light by the particles. Moreover, a plurality of optical fibers 21 to 23 are joined to the one end face of the sheet-shaped light guide 10, and optical fibers 31 to 33 are joined to the other end face. To the optical fibers 21 to 23 and 31 to 33, in usual, ones with large numerical apertures (N.A.) are applied, thus enabling the two-way communication.

Conditions in the case of receiving light by the optical fibers will be discussed next. According to the paper "High-Uniformity Star Coupler Using Diffused Light Transmission" IEICE TRANS. ELECTRON, Vol. E84C, No. 3 Mar. 2001 p. 339, requirements for a light receiver in a sheet-shaped light guide system for communication are as follows.

<<20.5 dBm (0 dBM=1 mW) or more is required as minimum received optical power of light receiver>>

This is calculated from a Bit-Error-Rate (BER) in the case of transmitting/receiving a signal of 500 Mbps, and the light receiver is PIN photodiode. Accordingly, this condition is not helpful in the case where the light receiver is different (for example, photomultiplier, avalanche photodiode and the like), or in the case where a transmission band is different. Specifically, in an arbitrary light receiver, the minimum received optical power which is acceptable in a certain transmission band should be present. Thus, the acceptable minimum received optical power of the light receiver, which satisfies the above-described condition, is defined as P(Receiver)min.

First, constraints in the case where the intensity distribution of the light emitted from the sheet-shaped light guide is flat are obtained from the above-described condition. Even when the intensity distribution of the emitted light is flat, in one optical fiber, a cross-section area ratio of $\pi/4$ between the light guide and the optical fiber necessarily lead to a loss, provided that a core diameter of the optical fiber is equal to thickness of the sheet-shaped light guide. Moreover, a tolerance is not considered here.

When the number of branches (number of nodes) is N, the optical power is lowered by a factor of 1/N. Moreover, when $\pi/4$ of the lowered quantity is counted as a loss, the optical power P(Receiver) received by the light receiver in an ideal case is represented as follows:

$$P(Receiver) = Eout \cdot (1/N) \cdot \pi/4 \tag{21}$$

Here, it is assumed that the light receiver receives all the light emitted from the optical fiber. Thus, when the optical power of the light incident onto the light guide is Pin, equation (21) is modified as follows:

$$P(Receiver) = Pin \cdot Eout \cdot (1/N) \cdot \pi/4 \tag{22}$$

The optical power received by the light receiver which is represented by dBm by taking a logarithm of this equation (22), is expressed as follows:

$$P(Receiver)_{dBm} = -10 Log\{Pin \cdot Eout \cdot (1/N) \cdot \pi/4\} \tag{23}$$

The relationship between the received optical power and the number of branches (number of nodes) is shown in FIG. 11 for the cases where the incident optical power is 1 mW and 10 mW. As understood from FIG. 11, naturally, the received optical power is proportional to the emitted optical power. Moreover, it is assumed here that the intensity distribution of the light emitted from the sheet-shaped light guide is flat. However, in fact, when the position of the light source is changed, the intensity distribution of the emitted light is also changed. Specifically, it is conceived that fluctuations occur in the received optical power, and the received optical power becomes the minimum at a portion where the intensity of the emitted light is the minimum.

Here, when the optical power Pin incident onto the light guide is given, a distribution profile of the emitted light given when the light source is at an arbitrary position is represented by a normalized intensity distribution function D(x, y), in which a direction along which the intensity distribution of the emitted light has a long side is taken as x, and a direction along which the intensity distribution thereof has a short side is taken as y. Moreover, each of units into which an incident portion or an exit portion is divided by the number of branches (number of nodes) is referred to as a segment, and it is assumed that the center (optical axis) of the optical fiber is ideally positioned at the center of each segment.

Therefore, when Segi is an integration region in an i-th segment, a mean value NPi in which the emitted optical power is normalized in the i-th segment is represented as follows:

$$NPi = \int_{Segi} D(x, y) dx dy \Big/ \int_{Seg_{max}} D(x, y) dx dy \tag{24}$$

Here, Segmax denotes a segment in which the optical power becomes the maximum among all the segments. Moreover, in a segment in which the optical power becomes the minimum, NPi is represented as follows:

$$NPi(min) = \int_{Seg_{min}} D(x, y) dx dy \Big/ \int_{Seg_{max}} D(x, y) dx dy \tag{25}$$

In equation (23), the total emitted optical power Pout is given by the following equation:

$$Pout = Pin \cdot Eout \tag{26}$$

From this relationship, with regard to the optical power PSegi in the i-th segment, the number of branches, the number of segments and the number of nodes are equal to one another. Accordingly, PSegi is represented as follows.

$$PSegi = Pout \cdot \left\{ NPi \Big/ \sum_{i=1}^{n} NPi \right\} \tag{27}$$

Note that, in this specification, for the sake of convenience, the following expression included in the above-described equation (27) is described as $\Sigma NPi$.

$$\sum_{i=1}^{n} NPi$$

The above-described equations (23) and (27) are combined, and 1/N given in the case where the intensity distribution of the emitted light is flat is replaced. Then, the following equation is established:

$$P(Receiver)_{dBm} = -10Log\{Pin \cdot Eout \cdot (NPi/\Sigma NPi) \cdot \pi/4\}$$

A numerical value necessary here is that given in the case where the optical power emitted from the optical fiber is the minimum, which can be obtained by equation (25). Specifically, when $P(Receiver\_min)_{dBm}$ is the minimum received optical power received by the light receiver, $P(Receiver\_min)_{dBm}$ is expressed as follows:

$$P(Receiver\_min)_{dBm} = -10Log\{Pin \cdot Eout \cdot (NPi(min)/\Sigma NPi) \cdot \pi/4\} \tag{28}$$

Pin: incident optical power
Eout: light emission efficiency
NPi(min): optical power in a segment in which the optical power becomes minimum
$\Sigma NPi$: sum of the optical power of segments Moreover, when the minimum optical power required for the light receiver in order to satisfy a certain BER is $PRmin_{dBm}$, the following relationship is established:

$$PR\min_{dBm} \leq P(\text{Receiver\_min})_{dBm}$$

Furthermore, when a coupling loss between a light emitter and the optical fiber is $K_E$, a coupling loss between the optical fiber and the sheet-shaped light guide is $K_F$, a coupling loss between the optical fiber and the light receiver is $K_R$, and an internal loss of the optical fiber is $K_{FI}$, the following relationship is established:

$$PR\min_{dBm} \leq P(\text{Receiver\_min})_{dBm} \cdot K_E \cdot K_F \cdot K_R \cdot K_{FI} \quad (29)$$

This expression (29) becomes the necessary condition for the communication system using the sheet-shaped light guide.

<BER (Bit-Error-Rate)>

The BER is an index indicating how much difference occurs between an original digital signal randomly generated and a received digital signal as a result of transmitting the original digital signal through a certain communication medium. When the number of transmitted bits is Bits and the number of bit errors is Biter, the BER is represented as follows:

$$BER = Biter/Bits \quad (30)$$

Next, a mechanism of the bit error generation will be discussed. First, distortion of an analog waveform created when an analog signal is converted into a digital signal is listed as a first factor. Moreover, the bit error is increased when a signal level is lowered, and accordingly, it is necessary to consider also S/N as a factor. Even when the signal level is lowered owing to the distortion of the waveform, the bit error should not occur if the signal level stably exceeds a threshold value for distinguishing "0" and "1" signals. Accordingly, when noise comes flying from the outside or occurs in the inside of the system to give a level change to the distorted waveform, such a phenomenon is conceived to become a cause of the bit error (see FIG. 12).

The most significant factor of the waveform distortion in the communication system using the sheet-shaped light guide is conceived to be waveform distortion owing to distortion of a received signal itself in which an arbitrary incident segment is corresponding to an exit segment, and a phase shift of each signal component included in a mixing signal corresponding to each incident segment and an arbitrary exit segment. Moreover, the above-described waveform distortion results from an optical path difference of signal light. Elements causing the optical path difference in the communication system using the optical fibers and the sheet-shaped light guide are the sheet-shaped light guide itself and the optical fibers. Specifically, it is supposed that the bit error occurs because the signal level is made lower than a predetermined threshold value by the waveform distortion when an analog signal is converted into a digital signal. Furthermore, when it is assumed that the digital signal is accompanied with a reference signal (reference clock) when being transmitted, and that the reference signal is referred to also when the digital signal is reads it is conceived that the bit error occurs when the phase difference (jitter) between the reference signal and the digitized signal is increased. Moreover, an analog signal in the vicinity of the threshold value fluctuates with respect to the threshold value owing to fluctuations by the noise, and is converted into an erroneous digital signal. Specifically, it is supposed that the bit error occurs because the factors of the optical path difference and the noise are combined.

<Relationship Between Optical Path Difference and Bit-Error-Rate (BER)>

Waveform distortion for the respective numbers of nodes, which are 4, 8 and 16, in the communication systems each using the sheet-shaped light guide, are shown in FIGS. 13A and 13B (4 nodes), FIGS. 14A and 14B (8 nodes), and FIGS. 15A and 15B (16 nodes). In these communication systems, an outer diameter of each optical fiber is 1 mm, and a length thereof is 1 m in which the optical path difference is ignorable. The optical fibers are provided in parallel while being closely adjacent to one another both on the light incident side and on the light exit side.

Moreover, numerical values of "In" and "Out" in each graph represent a light incident position and a light emission position by distances from a center position of the sheet-shaped light guide in the direction where the optical fibers are arrayed. The distances are represented by mm, and positions on a side where there are the optical fibers onto which the light is made incident are added with negative symbols (−), and positions on the other side are added with positive symbols (+). Specifically, FIG. 13A shows waveform distortion in the case where the light is made incident onto an optical fiber having a center at a position of −1.5 mm from the above-described center position, that is, the second optical fiber from the center position in the negative direction (optical fiber 21 in an example of FIG. 18 to be described later) and the light is emitted from an optical fiber having a center at the same position (optical fiber 31 in FIG. 18). FIG. 13B shows waveform distortion in the case where the light is made incident onto the optical fiber at the same position as described above (optical fiber 21 in FIG. 18) and the light is emitted from an optical fiber having a center at a position of +1.5 mm from the above-described center position, that is, a second optical fiber from the center position in the positive direction (optical fiber 34 in FIG. 18). Moreover, FIG. 14A shows waveform distortion in the case where the light is made incident onto an optical fiber having a center at a position of −3.5 mm from the above-described center position, that is, a fourth optical fiber from the center position in the negative direction and the light is emitted from an optical fiber having a center at the same position. FIG. 14B shows waveform distortion in the case where the light is made incident onto the optical fiber having the center at the same position as described above and the light is emitted from an optical fiber having a center at a position of +3.5 mm from the center position, that is, a fourth optical fiber from the center position in the positive direction. Furthermore, FIG. 15A shows waveform distortion in the case where the light is made incident onto an optical fiber having a center at a position of −7.5 mm from the above-described center position, that is, an eighth optical fiber from the center position in the negative direction and the light is emitted from an optical fiber having a center at the same position. FIG. 15B shows waveform distortion in the case where the light is made incident onto the optical fiber at the same position as described above and the light is emitted from an optical fiber having a center at a position of +7.5 mm from the above-described center position, that is, an eighth optical fiber from the center position in the positive direction.

From these graphs, it can be understood that the level change owing to the waveform distortion is ignorable in an input signal of 1 Gbps.

<Relationship Between S/N and BER>

It is conceived that an occurrence of erroneous reading (bit error) is also related to quality of the signal, that is, S/N.

Specifically, even if main components of spectra of adjacent signals from which harmonic components are removed are separated, when the harmonic components (noise components) are large, signals cannot be distinguished as individual signals. When an extreme case is imagined, it is conceived that it is usually impossible to detect such a signal buried in the noise components unless the signal is particularly subjected to filtering processing.

As the noise component, there is external noise such as radiation noise and induction noise, in addition to noise occurring in the inside of the system, such as thermal noise (Johnson Noise), quantum noise (Shot Noise), 1/f noise characteristic of a semiconductor device for use in the light emitter and the light receiver. Here, for the purpose of evaluating performance of the system itself, the external noise is ignored, and only the noise occurring in the inside of the system is considered. Moreover, an influence of the 1/f noise is ignored.

Power (Noise(Total)) of the noise components is represented as:

$$\text{Noise(Total)} = \text{Noise(thermal)} + \text{Noise(quantum)} \quad (31)$$

Each component represented by the power for a light receiving element is as follows:

$$\text{Noise(thermal)} = (4kT/R) \cdot \Delta v \quad (31a)$$

k: Planck constant
T: equivalent temperature (determined by noise factor)
R: load resistance of light receiver
$\Delta v$: band of light receiver $$\text{Noise(quantum)} = 3e^2 \cdot (P+P_B) \cdot \eta \cdot \Delta v/(h\nu) + 2ei_d \Delta v \quad (31b)$$

e: electron charge
P: signal light power
$P_B$: background light power
$\eta$: quantum efficiency
h: Planck constant
v: frequency of signal light
$i_d$: dark current
$\Delta v$: band of light receiver Here, it is considered to rectify a signal of the 0.25 GHz band, output of which is not lowered, when a signal of 0.5 Gbps is generated. Specifically, the band of the photodiode is 0.25 GHz. In this case, as an example, for a Si-photodiode: S5973 made by Hamamatsu Photonics K.K., the noise components are calculated where $P=8.9 \times 10^{-6}$ W (20.5 dBm), $\eta=0.4$, $R=50\ \Omega$, and $T=300$ K. The calculated values converted into current values become as follows:

$$\text{Noise(thermal}_{rms}) = 2.88 \times 10^{-7} (A)$$

$$\text{Noise(quantum}_{rms}) = 8.19 \times 10^{-8} (A)$$

The total noise component becomes as follows:

$$\text{Noise(total}_{rms}) = 3.70 \times 10^{-7} (A) \quad (32)$$

Meanwhile, a signal current Sc in the minimum received optical power is given by:

$$Sc = P \cdot e \cdot \eta/(h \cdot v) \quad (33)$$

Accordingly, a signal current S(min) cat the minimum received optical power becomes as follows:

$$S(min)c = 2.46 \times 10^{-6} (A)$$

Therefore, a signal-to-noise ratio (S/N) in this case becomes S/N(Pmin)=6.65.

Incidentally, when the noise is approximated by Gaussian because the thermal noise is dominant over the distribution of the noise, a probability of occurrence of noise Pr(S/N=1) in the case where the system noise at certain timing becomes 6.65 times the rms noise, that is, in the case where a signal current level becomes equal to a noise current level (S/N=1), becomes as follows:

$$Pr(S/N=1) \approx 3.47 \times 10^{-11}$$

The probability thus becomes a value approximate to $BER \approx 1 \times 10^{-11}$, and becomes a value approximate to a probability of occurrence of the BER in the above-described U.S. Pat. No. 5,548,670. Furthermore, in the case of using a high-pass filter of approximately 20 MHz, which causes no trouble in transmission of the digital signal, the following are obtained:

$$S/N(Pmin)=6.81$$

$$Pr(S/N=1) \approx 1.31 \times 10^{-11}$$

These substantially agree with those described in "High-Uniformity Star Coupler Using Diffused Light Transmission" IEICE TRANS. ELECTRON, Vol. E84C, No. 3 Mar. 2001 p. 339. Specifically, the above-described results constitute grounds for conceiving that the conventional supposition regarding the BER is correct. Note that, in FIG. 16, the relationship between levels of the root mean square (rms) noise and probabilities of occurrence thereof is shown.

Furthermore, the supposition regarding the BER is further advanced, and a more practical technique will be discussed. First, typical rms noise (voltage value) in the communication system using the sheet-shaped light guide is measured, and defined as Noise(System_rms). Additionally, when the BER acceptable in the system is defined as BER(accept) and the relevant received signal power is defined as PRmin, a signal voltage S(PRmin)v is represented as follows:

$$S(PRmin)v = PRmin \cdot e \cdot \eta/(h \cdot v) \times R \quad (34)$$

where R is a load resistance. Moreover, a level of the threshold value of the (0, 1) signal is defined as V(Thresh), and S/N(Thresh) in which the level of the threshold value is considered is defined as follows:

$$S/N(\text{Thresh}) = \{S(PRmin)v - V(\text{Thresh})\}/\text{Noise(System}\_rms) \quad (35)$$

When the value given by this equation (35) reaches a certain value, the BE occurs at a certain probability, which is defined as S/Naccept. Then, from the above-described discussion, it is conceived that the probability of occurrence of the Noise(System_rms) in this case is equal to the BER. FIG. 17 shows the relationship between the received optical power and the BER calculated on the basis of the above-described discussion. This relationship closely approximates to the result of the actual measurement in "High-Uniformity Star Coupler Using Diffused Light Transmission" IEICE TRANS. ELECTRON, Vol. E84C, No. 3 Mar. 2001 p. 339, and a shape thereof is also very similar to that thereof.

Considering the V(Thresh), the BE occurs when a value obtained by subtracting the noise component from the signal component is lower than the V(Thresh) and when a value obtained by adding the noise component to the "0" level exceeds the V(Thresh). Therefore, it is conceived desirable that the V(Thresh) be set at a half value of an average signal voltage.

From the above discussion, in the communication system using the sheet-shaped light guide, a communication system configured in the following manner can be defined. When the acceptable BER, that is, BER(accept) is given, and the rms noise of the system is defined as the Noise(System_rms), the probability Pr(Noise(System_rms)) of occurrence of the Noise(System_rms) is the Noise(System_rms) of a level which satisfies the following in a band where it is not necessary to consider the distortion of the signal waveform:

$$Pr(Noise(System\_rms) \cdot Q) \leq BER(accept) \quad (36)$$

where Q is a proportionality constant. At the same time, when an arbitrary threshold value V(Thresh) in binarization is given, the signal level is of the input signal PRmin which satisfies the following expression:

$$\{S(PRmin)v - V(Thresh)\} > Noise(System\_rms) \cdot Q \quad (37)$$

Moreover, the signal level is of the signal voltage S(PRmin)v outputted through a load resistor from a light receiver which satisfies the expression (37).

Alternatively, for the above-described reason, the above-described expression (37) can also be defined as follows:

$$S(PRmin)v/2 > Noise(System\_rms) \cdot Q \quad (38)$$

Furthermore, such a circuit configuration as capable of measuring the BER in the inside of the system may be provided to adjust the output power PRmin of the light source so as to satisfy the BER(accept) condition, so that the expression (37) and the expression (38) is satisfied. In this case, it is made possible to cope with the external noise other than the Noise(System_rms) generated by the system itself, by providing a digital circuit which makes feedback from the BER measurement circuit to the light source side, and by configuring this digital circuit to control the optical power of the light source in accordance with a table determined on the basis of the BER(accept).

DESCRIPTION OF THE PREFERRED EMBODIMENT

An embodiment of the present invention will be described below in detail with reference to the drawings.

Figure 1:
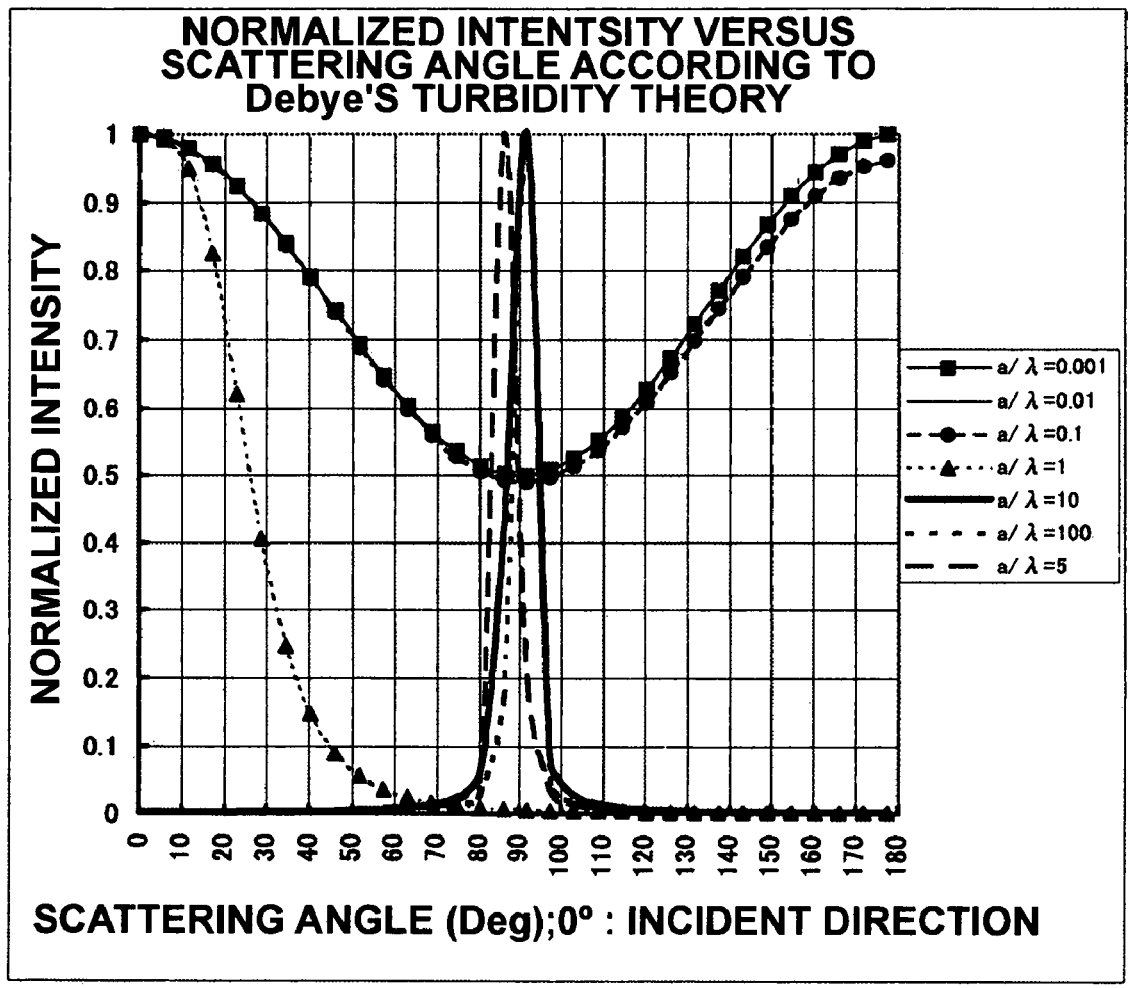
FIG. 1 is a graph of normalized intensity versus scattering angle according to Debye's turbidity theory.
Figure 2:
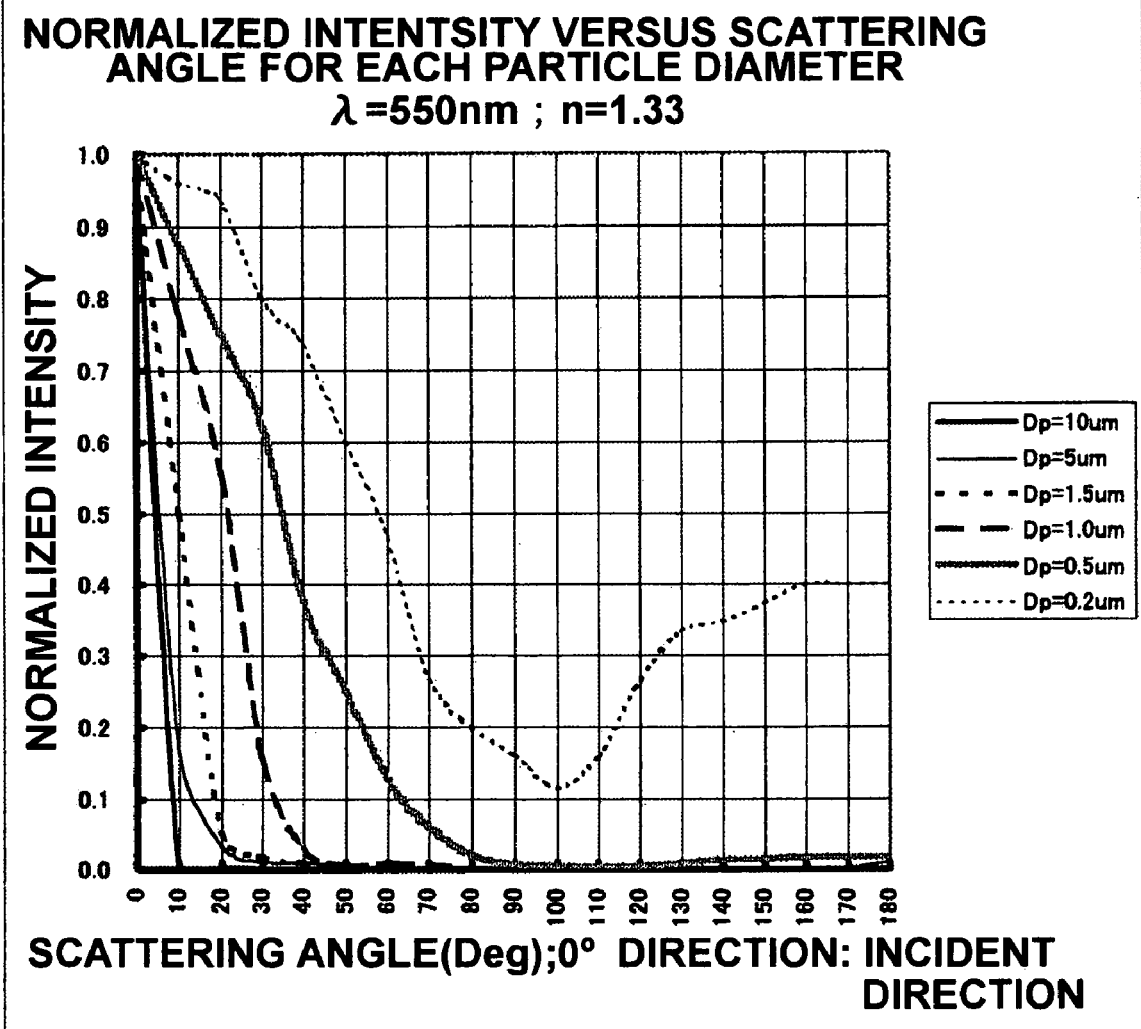
FIG. 2 is a graph of normalized intensity versus scattering angle according to Mie scattering theory.
Figure 3A:
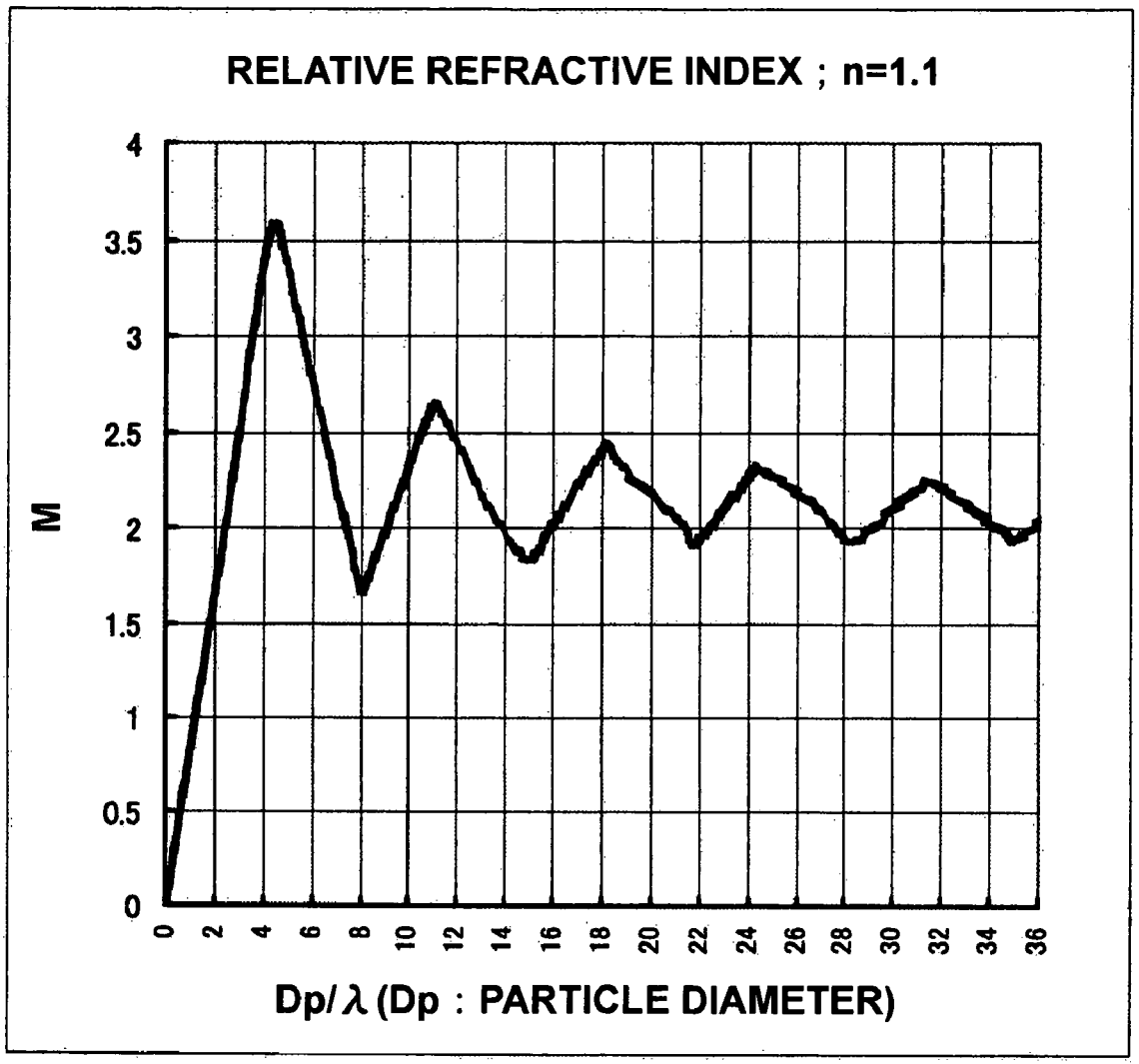
FIG. 3A is a graph showing a manner in which the scattering cross section oscillates in Mie scattering theory when a relative refractive index is 1.1.
Figure 3B:
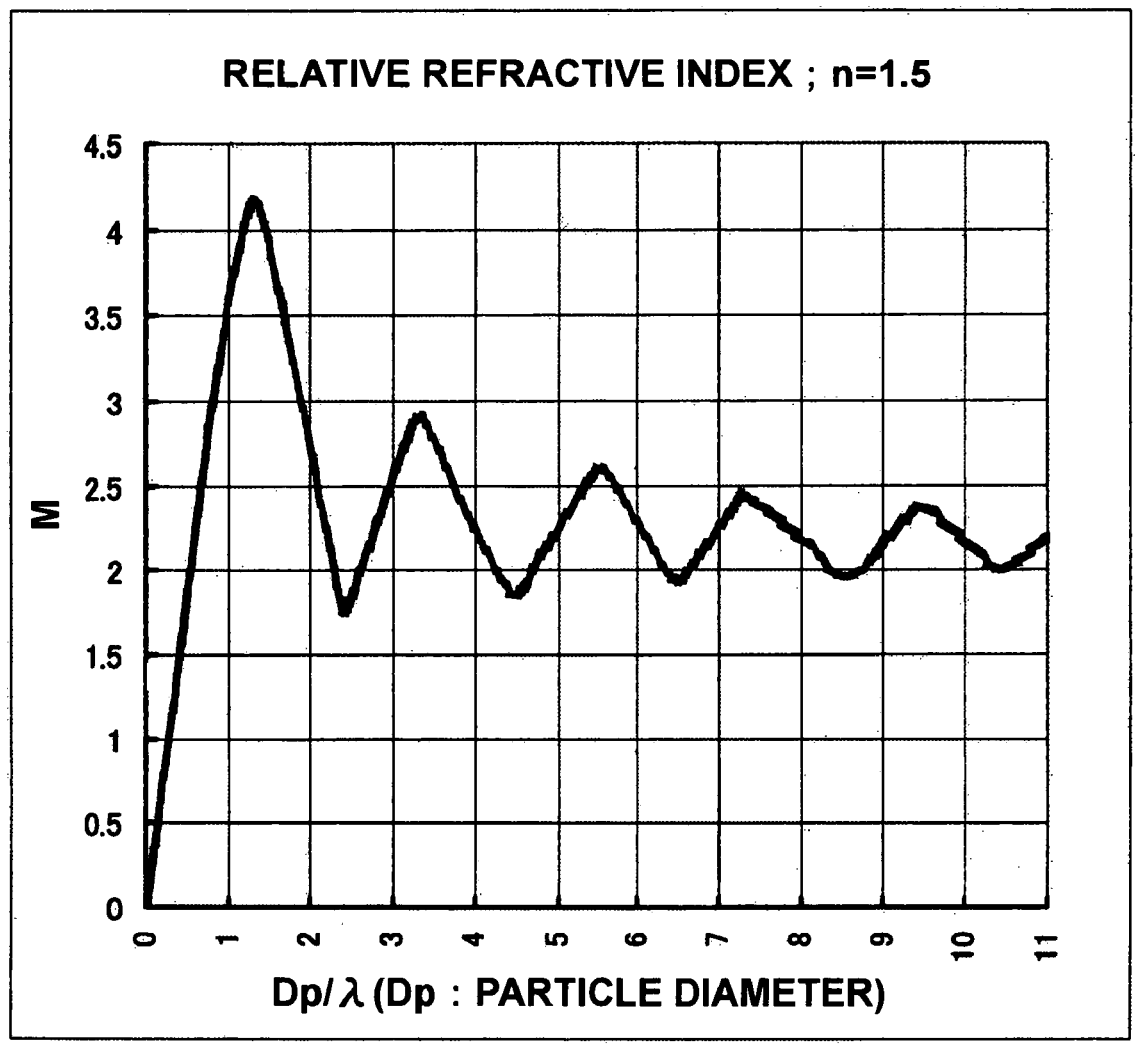
FIG. 3B is a graph showing a manner in which the scattering cross section oscillates in Mie scattering theory when a relative refractive index is 1.5.
Figure 3C:
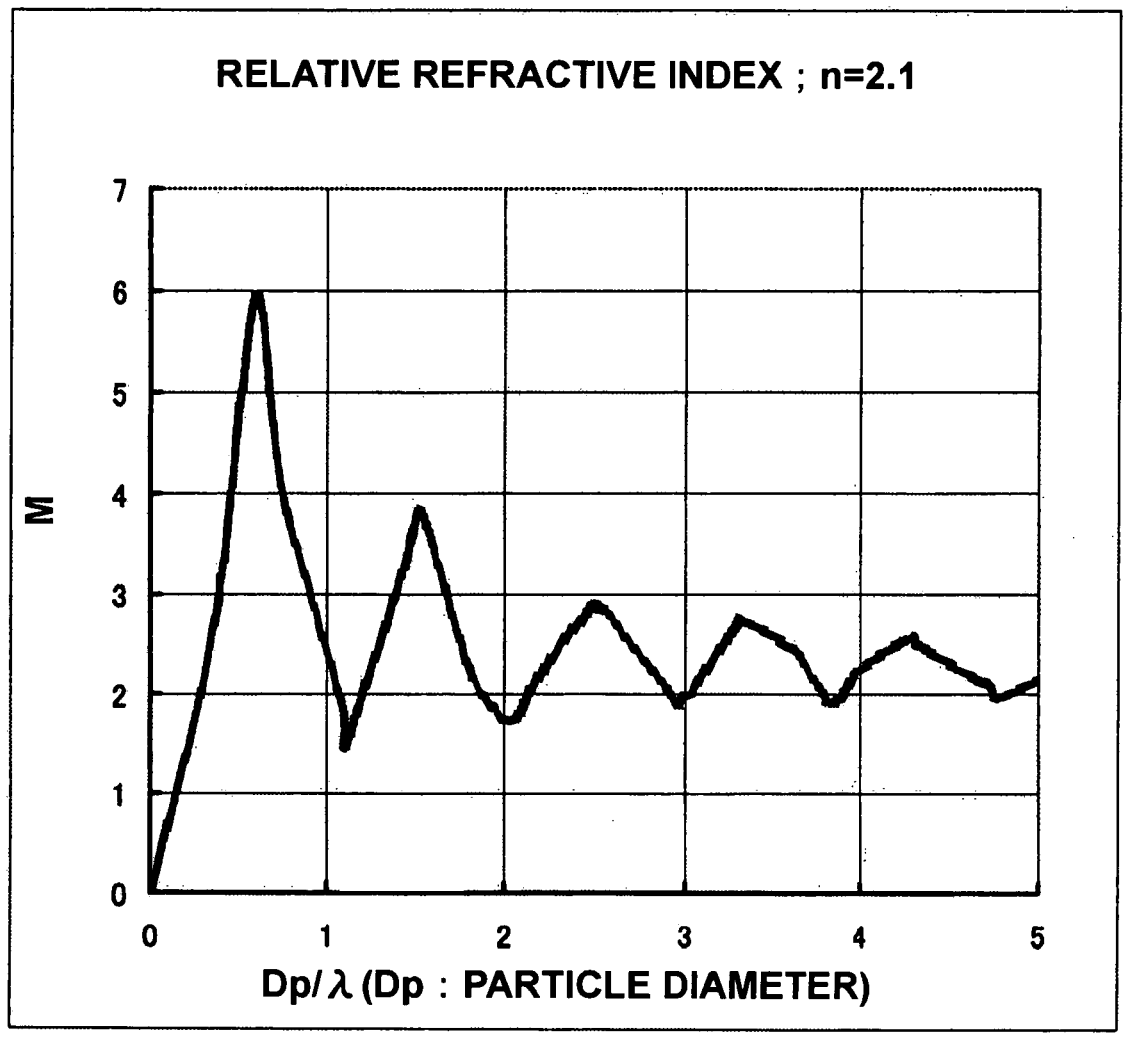
FIG. 3C is a graph showing a manner in which the scattering cross section oscillates in Mie scattering theory when a relative refractive index is 2.1.
Figure 4:
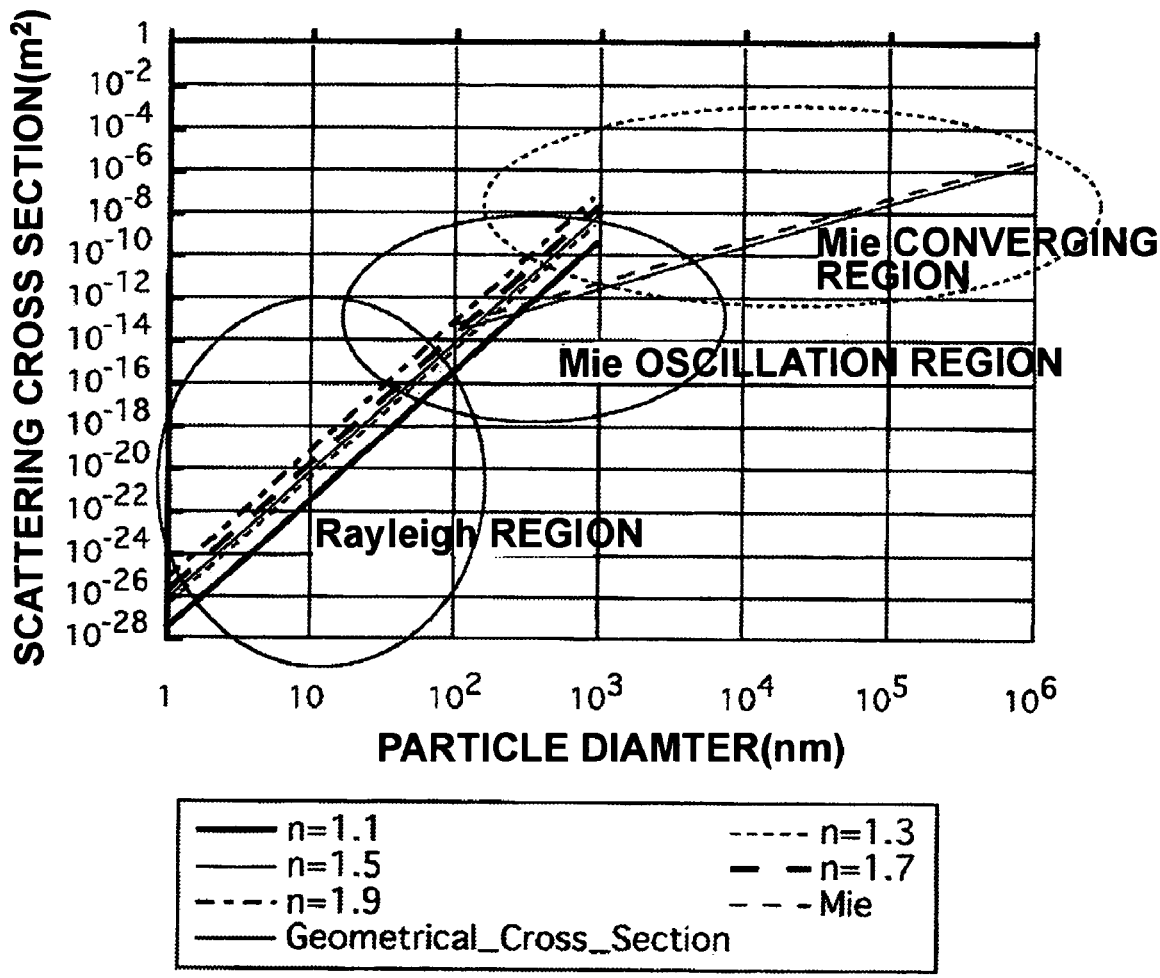
FIG. 4 is a graph showing results of the relationship between particle diameter and scattering cross section, which are obtained by means of computer simulation with respect to each of some relative refraction indexes.
Figure 5:
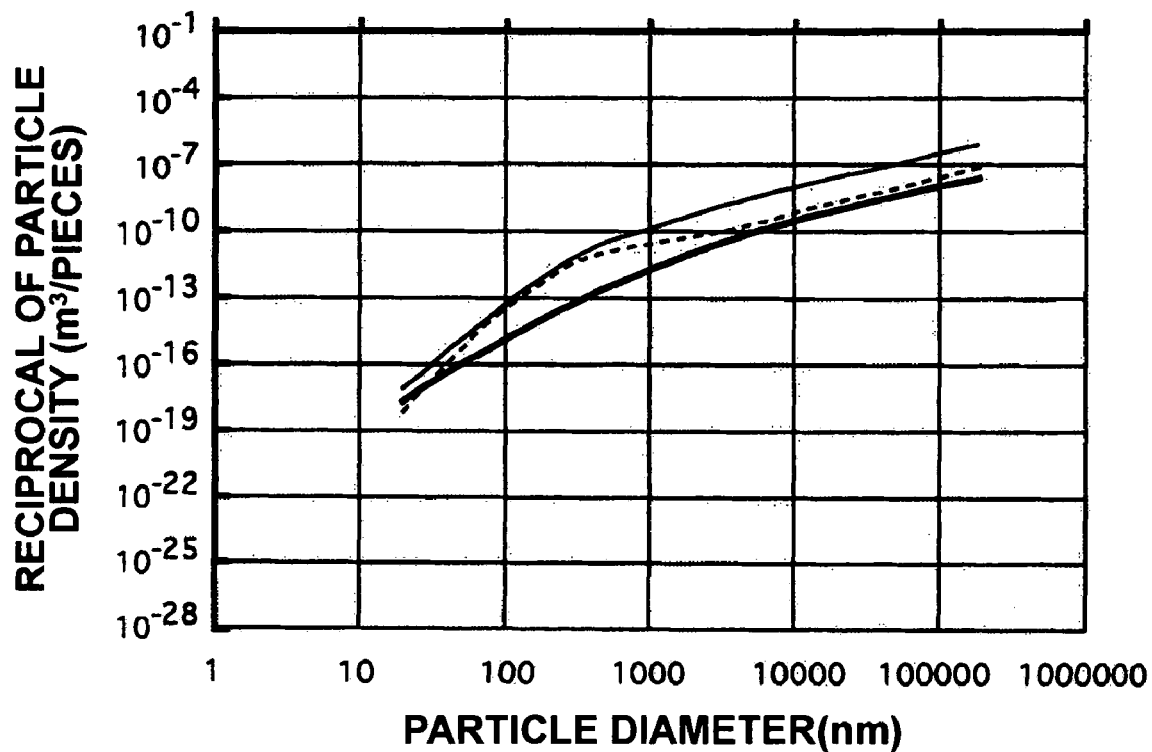
FIG. 5 is a graph showing results of the relationship between particle diameter and reciprocal of the particle density in a multi-particle system, which are obtained by means of the computer simulation.
Figure 6:
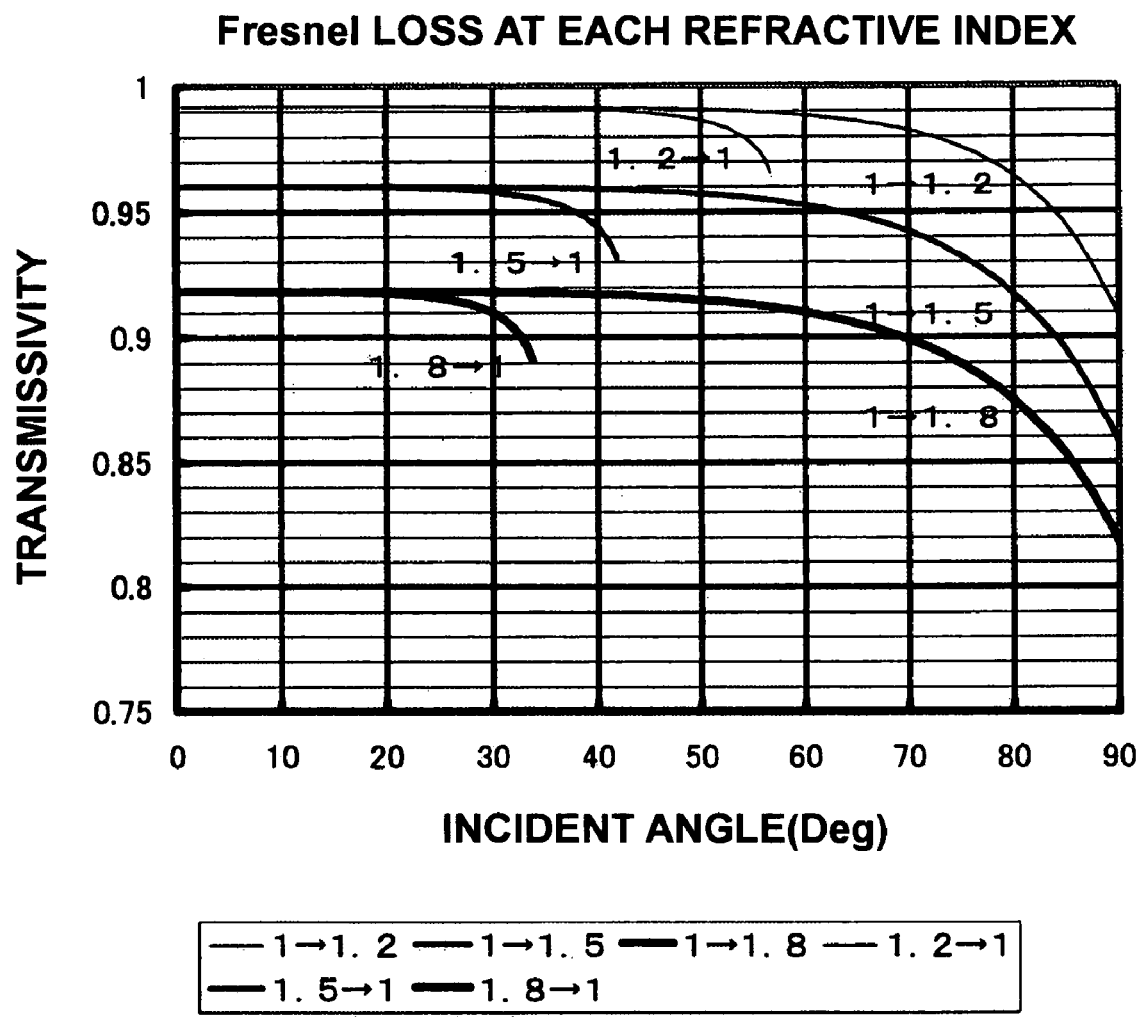
FIG. 6 is a graph showing Fresnel losses for various refractive indexes of an optical medium.
Figure 7A:
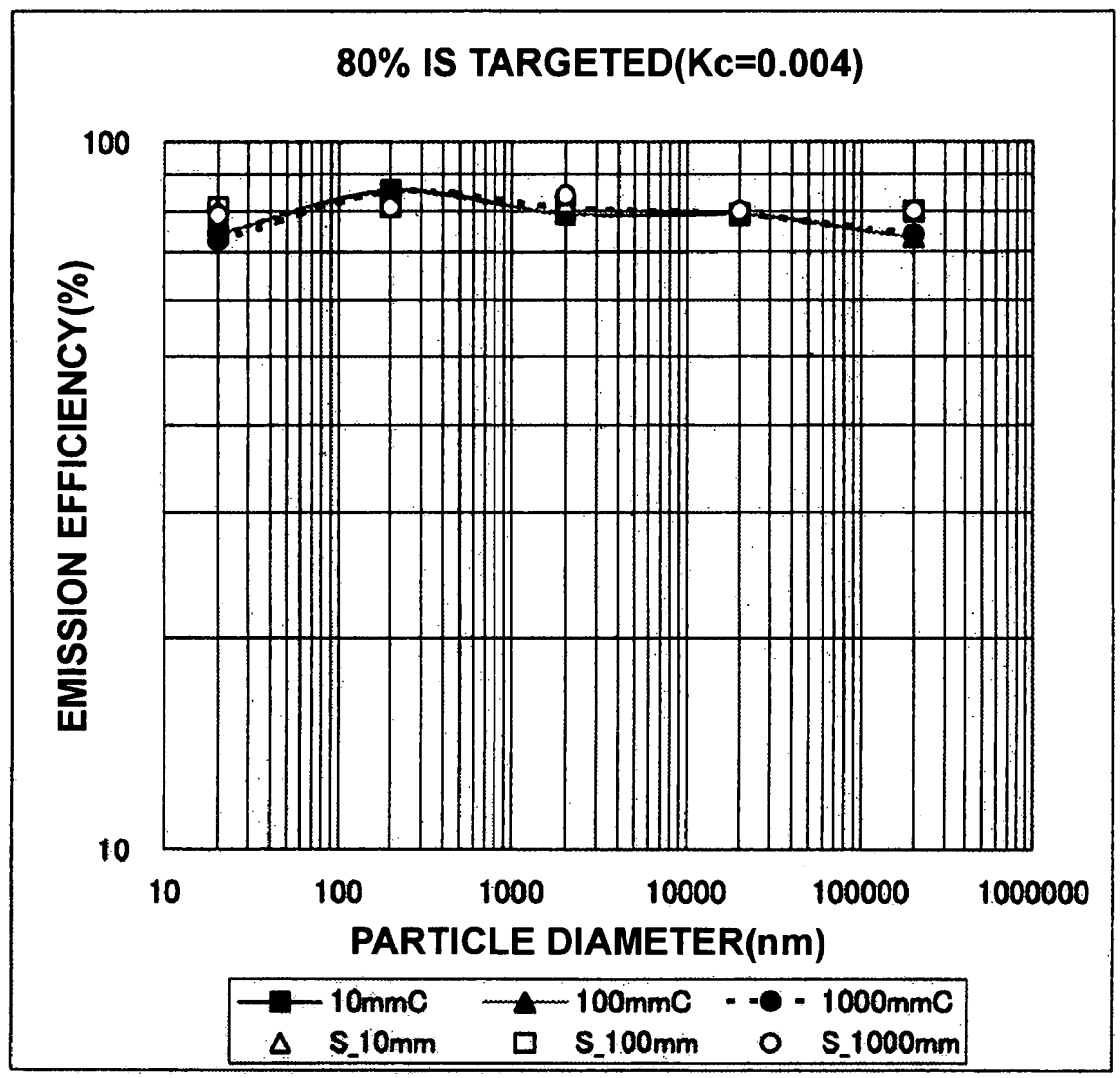
FIG. 7A is a graph showing the relationship between particle diameter and light emission efficiency while comparing a result obtained by the use of a method of the present invention and a result by means of a computer simulation (light emission efficiency of 80% is targeted).
Figure 7B:
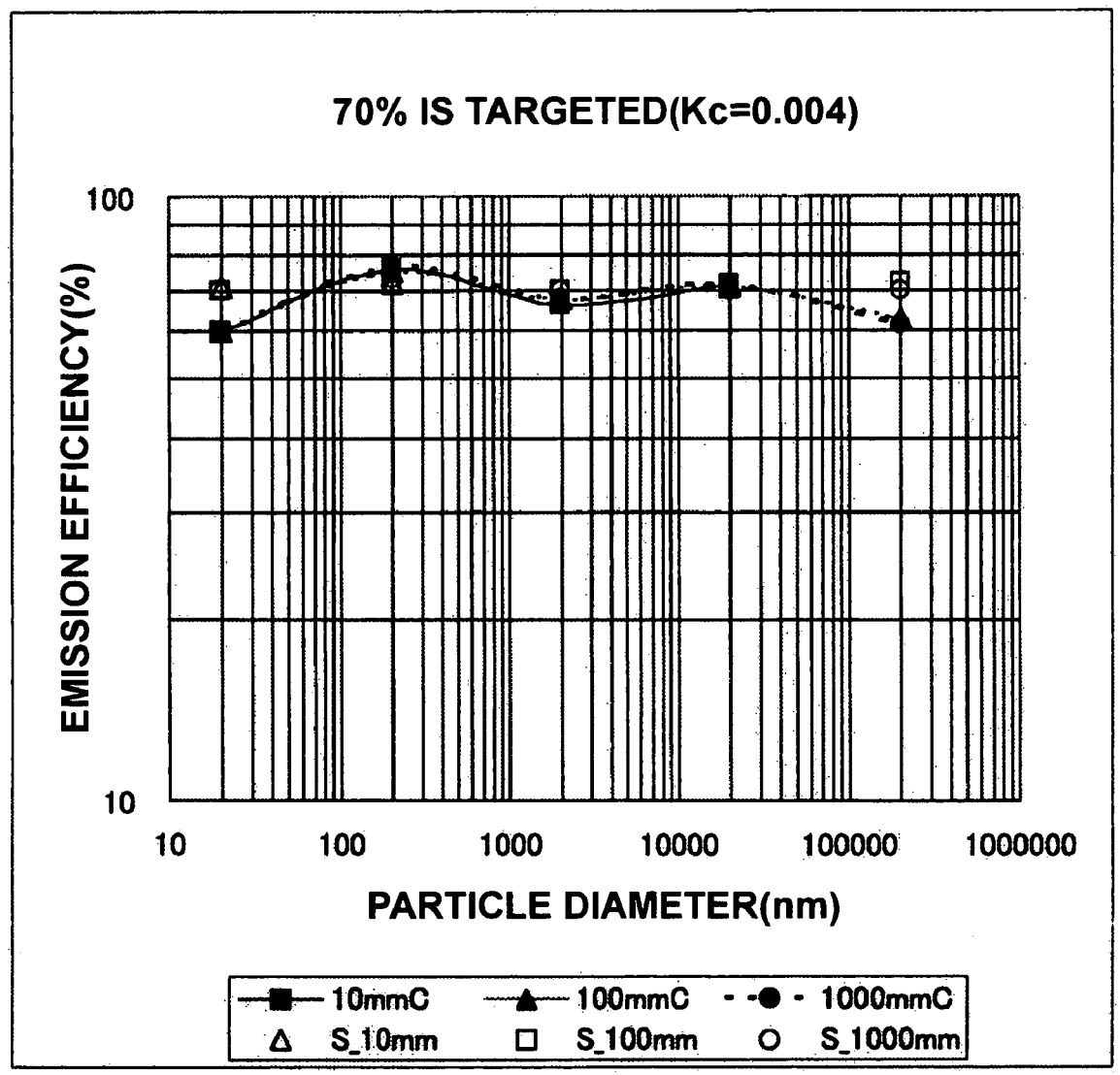
FIG. 7B is a graph showing the relationship between particle diameter and light emission efficiency while comparing a result obtained by the use of a method of the present invention and a result by means of a computer simulation (light emission efficiency of 70% is targeted).
Figure 7C:
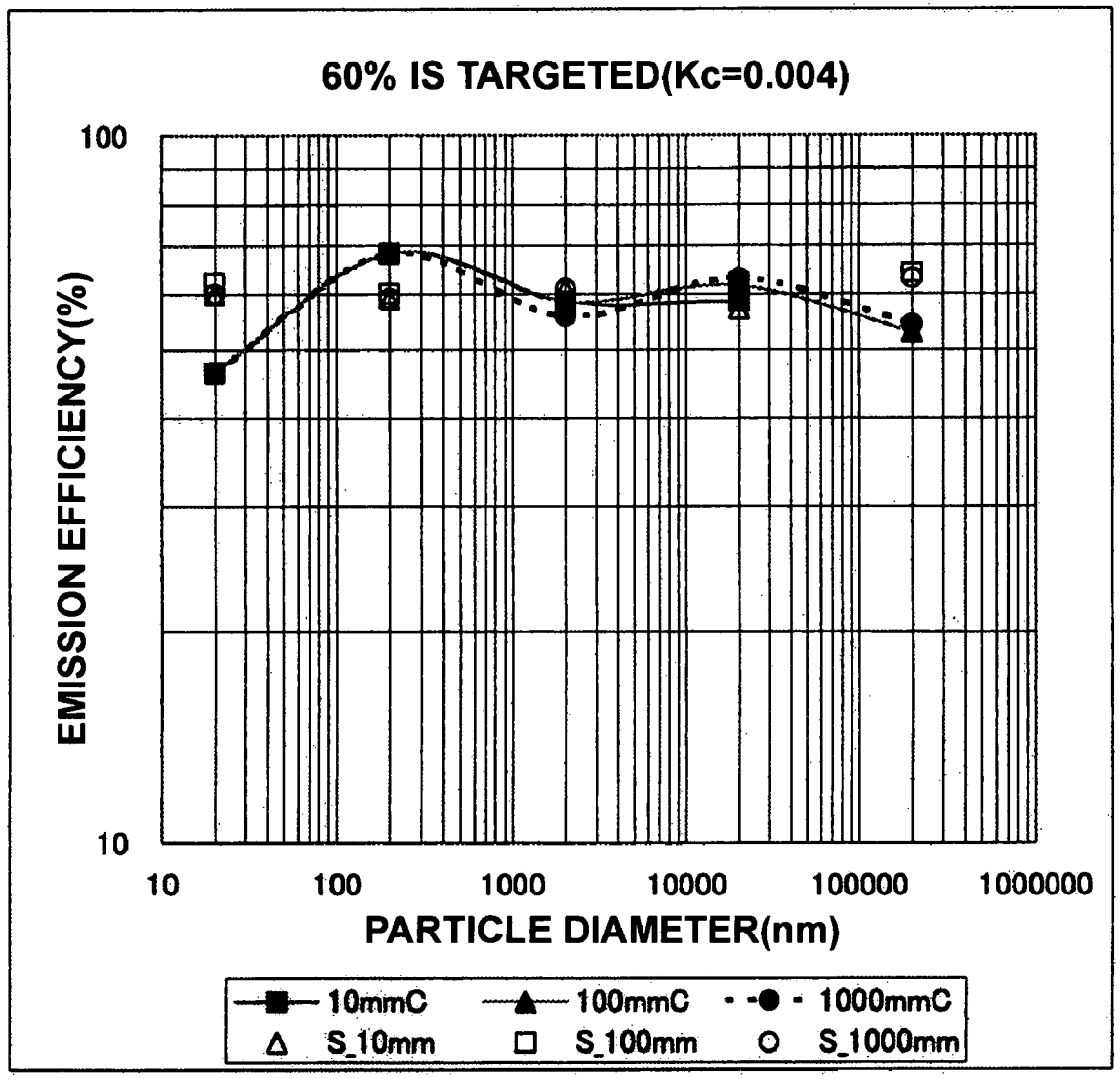
FIG. 7C is a graph showing the relationship between particle diameter and light emission efficiency while comparing a result obtained by the use of a method of the present invention and a result by means of a computer simulation (light emission efficiency of 60% is targeted).
Figure 7D:
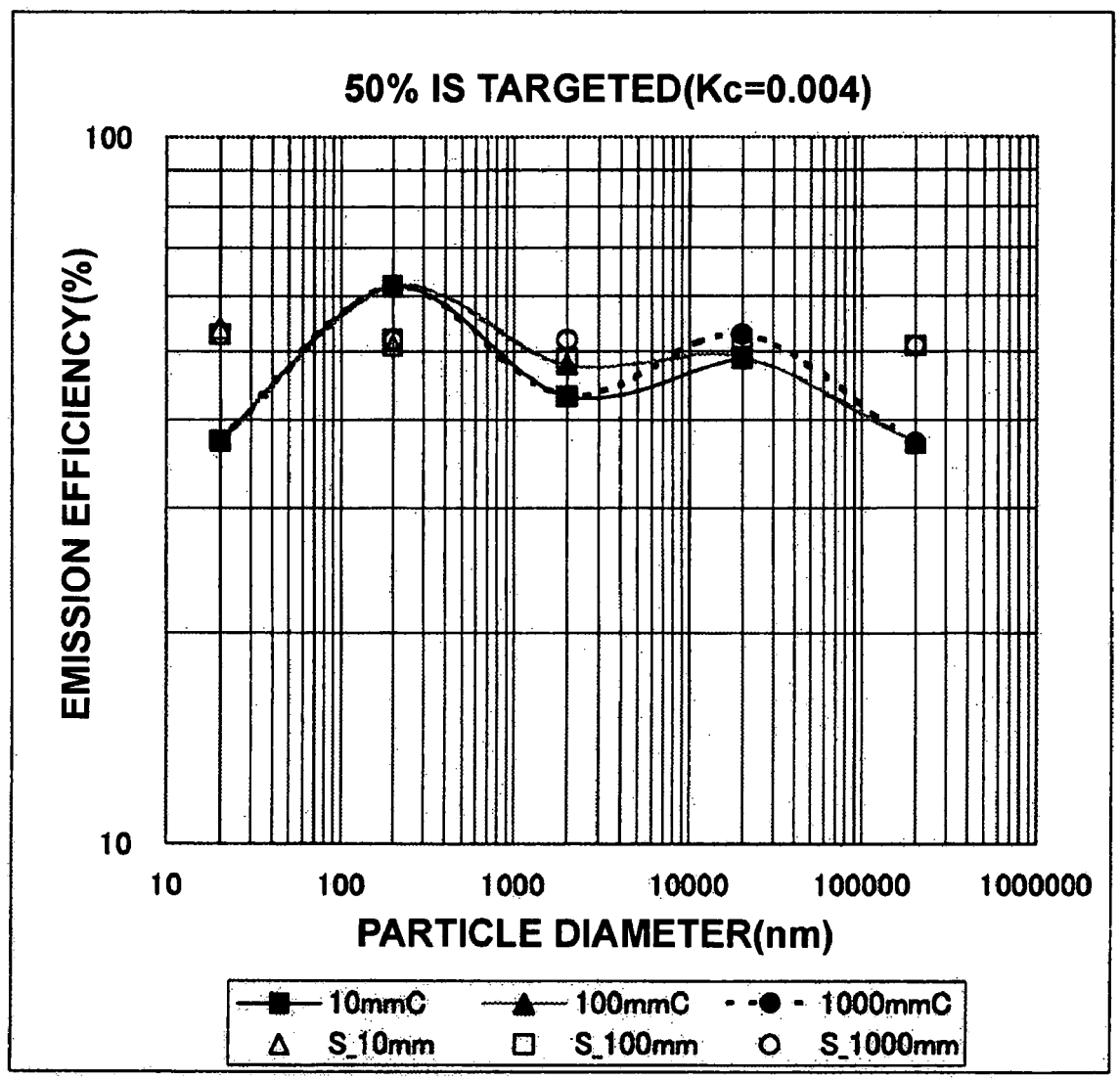
FIG. 7D is a graph showing the relationship between particle diameter and light emission efficiency while comparing a result obtained by the use of a method of the present invention and a result by means of a computer simulation (light emission efficiency of 50% is targeted).
Figure 7E:
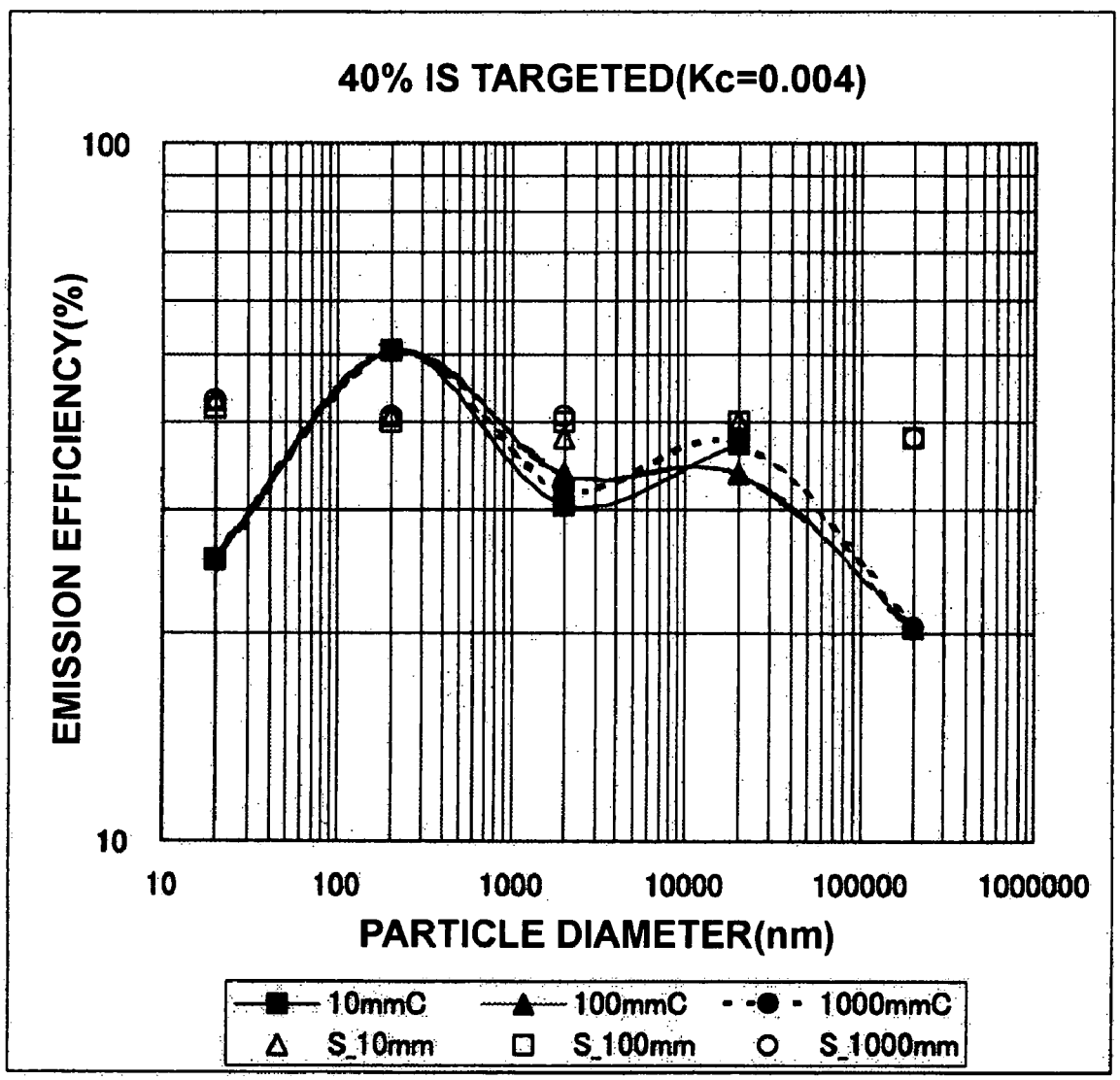
FIG. 7E is a graph showing the relationship between particle diameter and light emission efficiency while comparing a result obtained by the use of a method of the present invention and a result by means of a computer simulation (light emission efficiency of 40% is targeted).
Figure 8A:
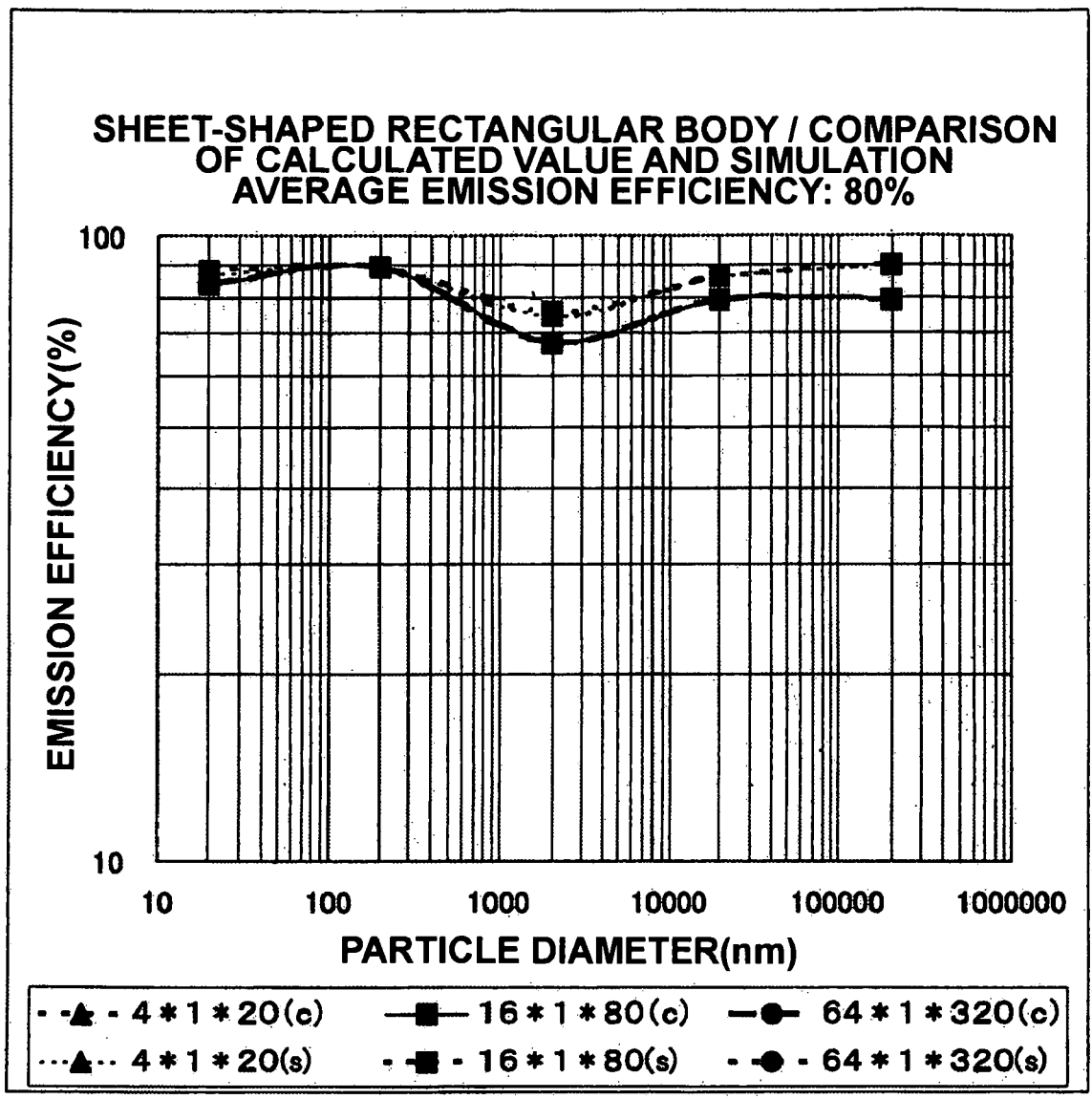
FIG. 8A is a graph showing the relationship between particle diameter and light emission efficiency in a sheet-shaped light guide while comparing a result obtained by calculation and a result by simulation (average light emission efficiency: 80%).
Figure 8B:
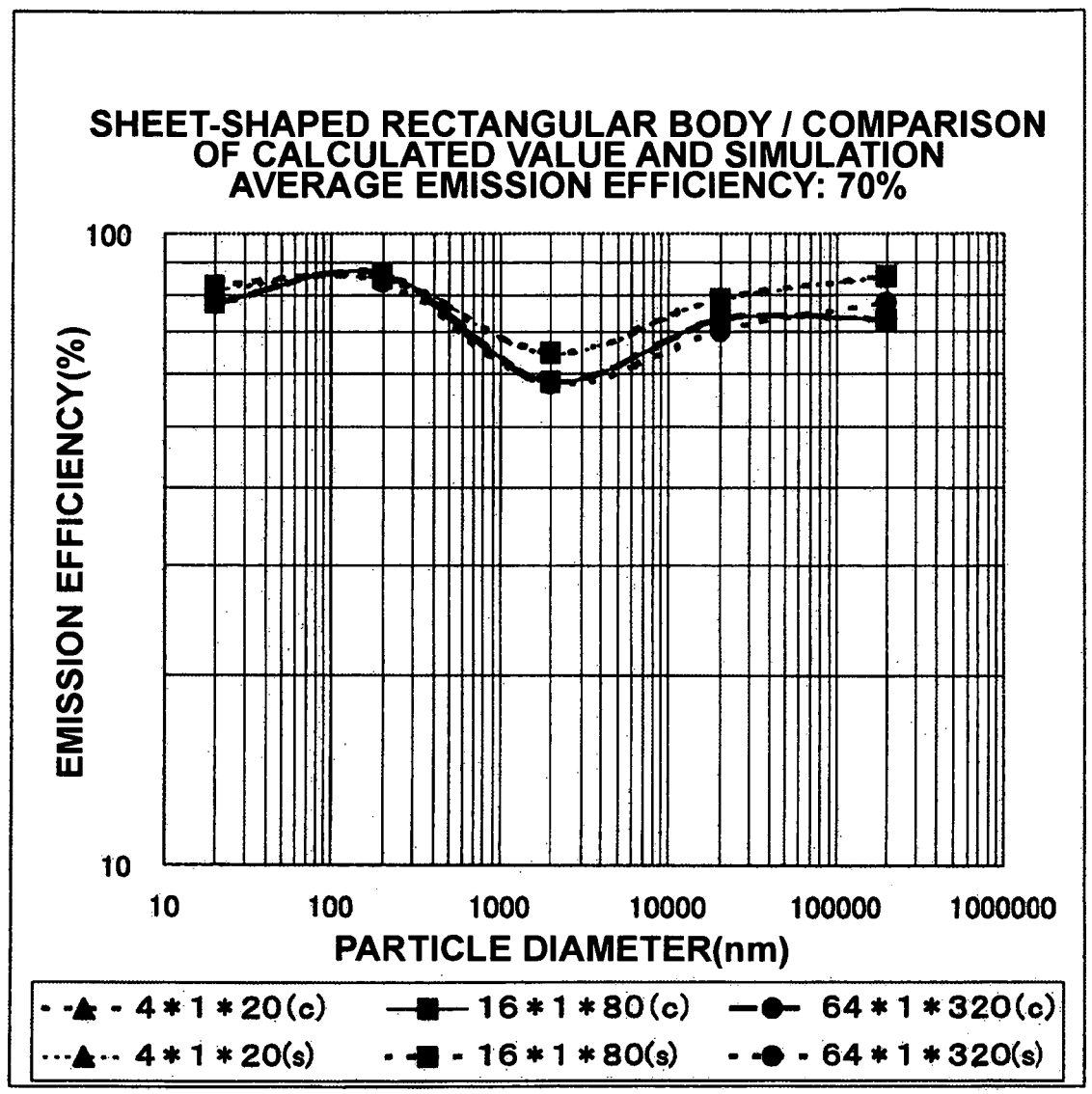
FIG. 8B is a graph showing the relationship between particle diameter and light emission efficiency in a sheet-shaped light guide while comparing a result obtained by calculation and a result by simulation (average light emission efficiency: 70%).
Figure 8C:
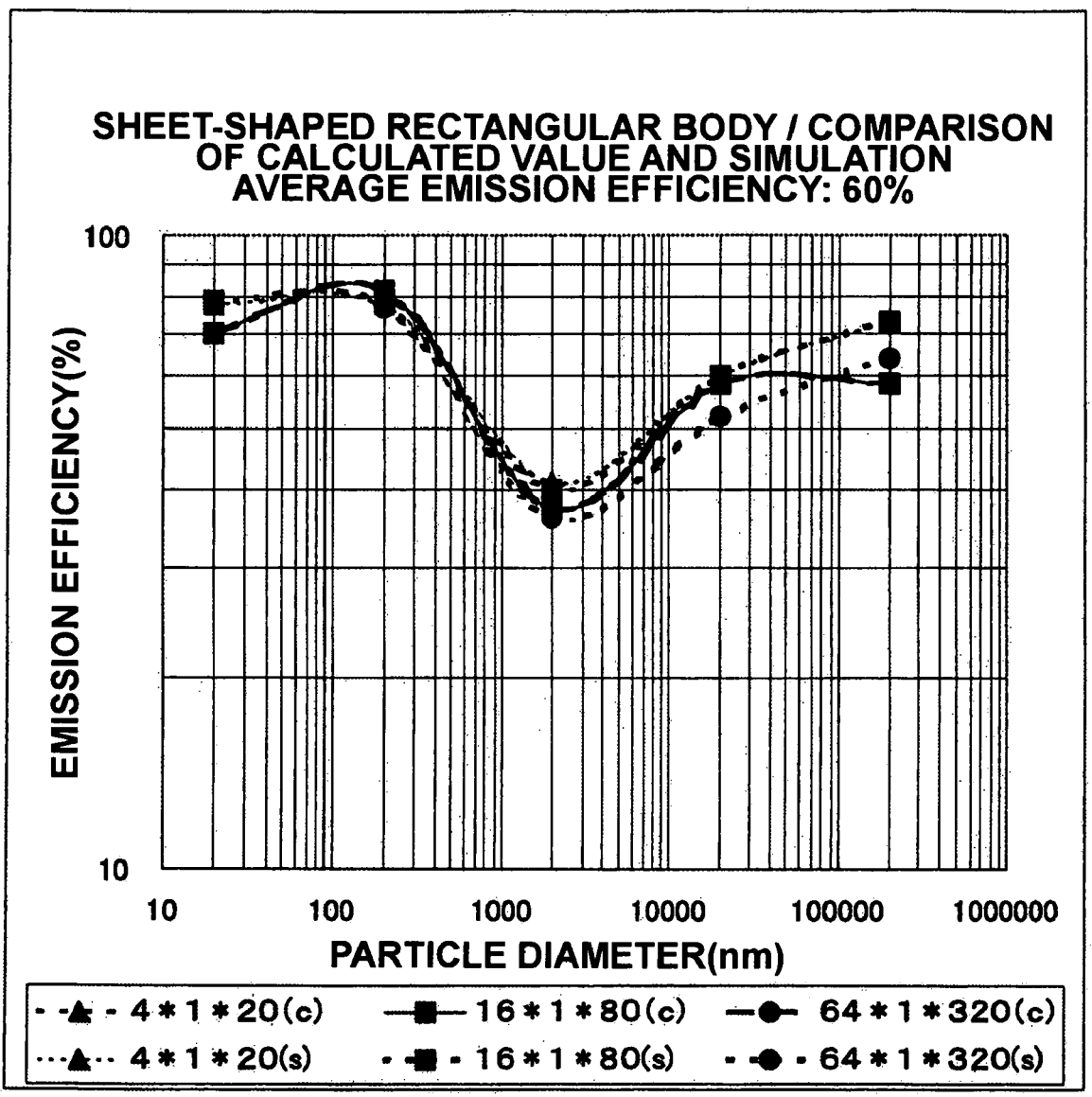
FIG. 8C is a graph showing the relationship between particle diameter and light emission efficiency in a sheet-shaped light guide while comparing a result obtained by calculation and a result by simulation (average light emission efficiency: 60%).
Figure 9A:
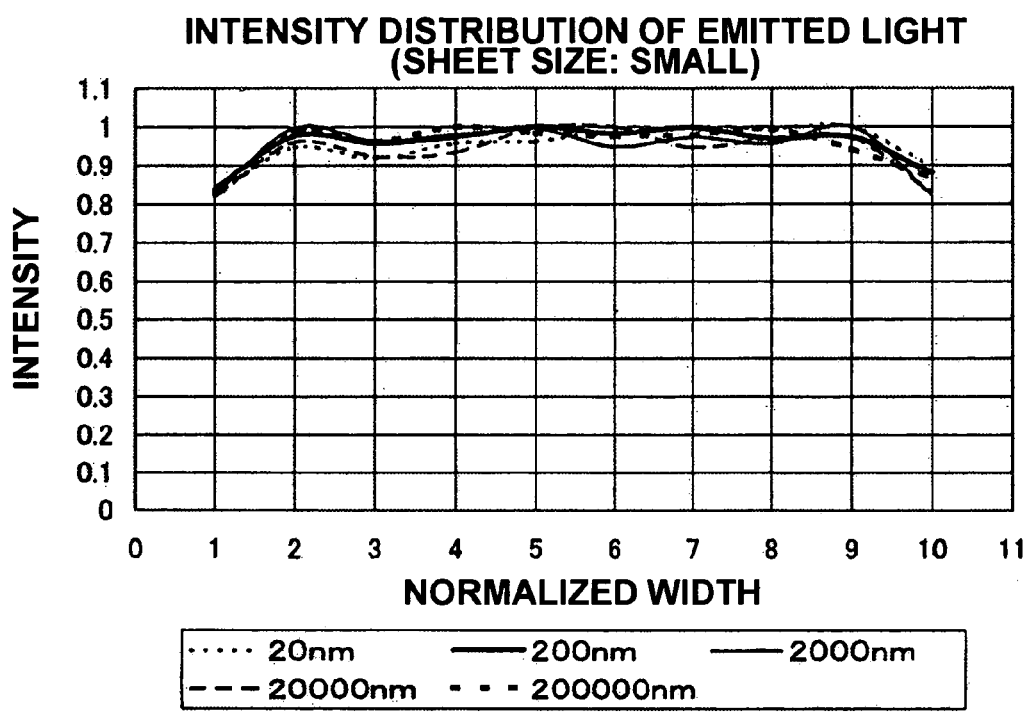
FIG. 9A is a graph showing distribution characteristics of emitted light intensity in a sheet-shaped light guide when the sheet size is small.
Figure 9B:
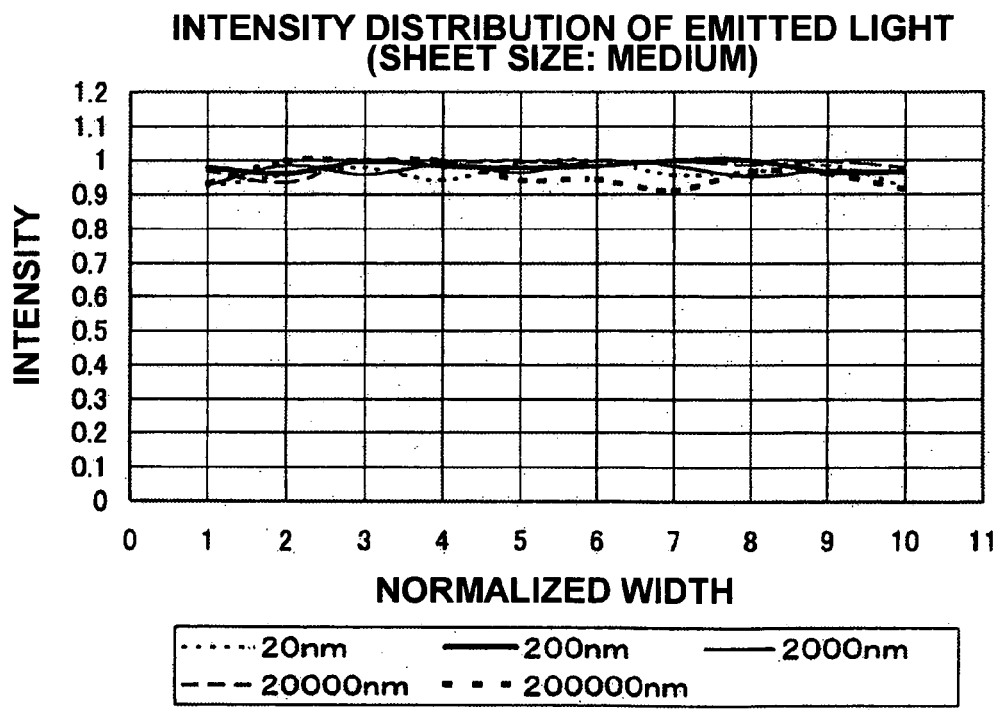
FIG. 9B is a graph showing distribution characteristics of emitted light intensity in a sheet-shaped light guide when the sheet size is medium.
Figure 9C:
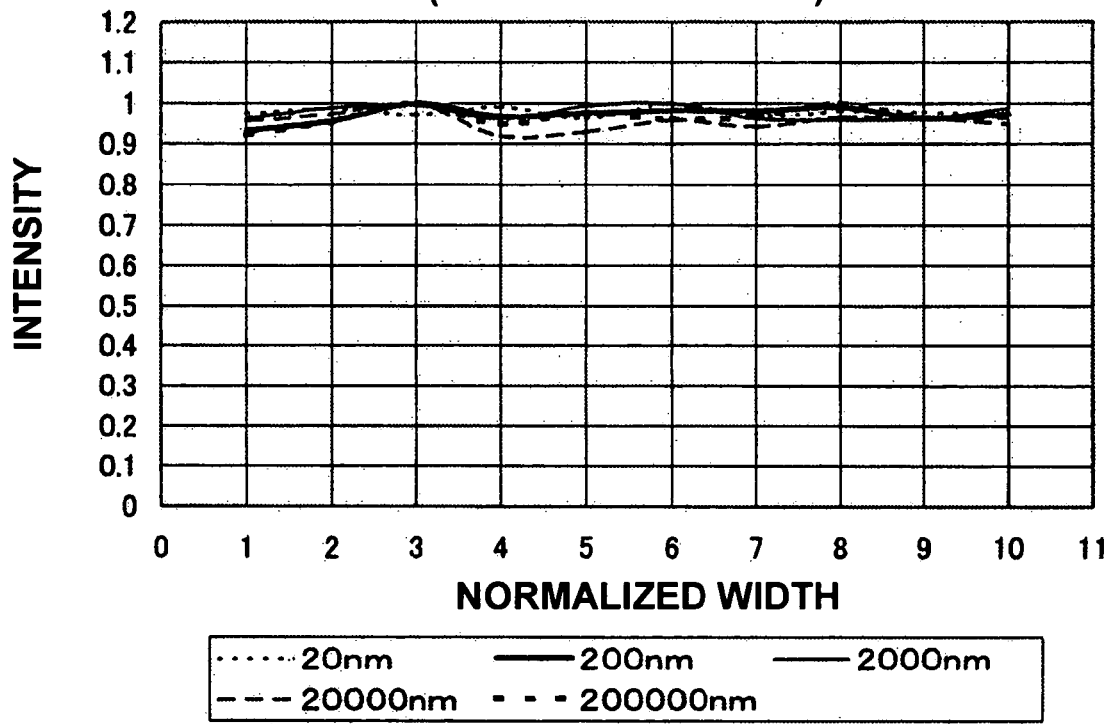
FIG. 9C is a graph showing distribution characteristics of emitted light intensity in a sheet-shaped light guide when the sheet size is large.
Figure 10:
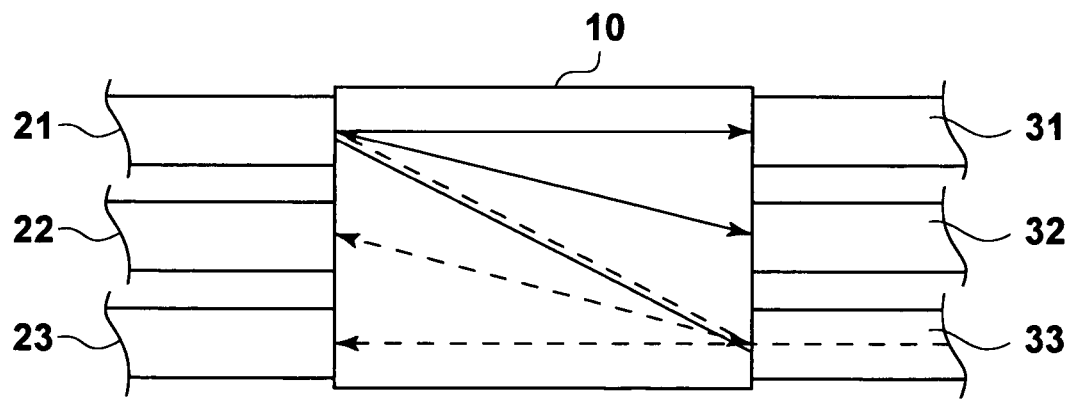
FIG. 10 is a plan view showing a schematic shape of a sheet-shaped light guide.
Figure 11:
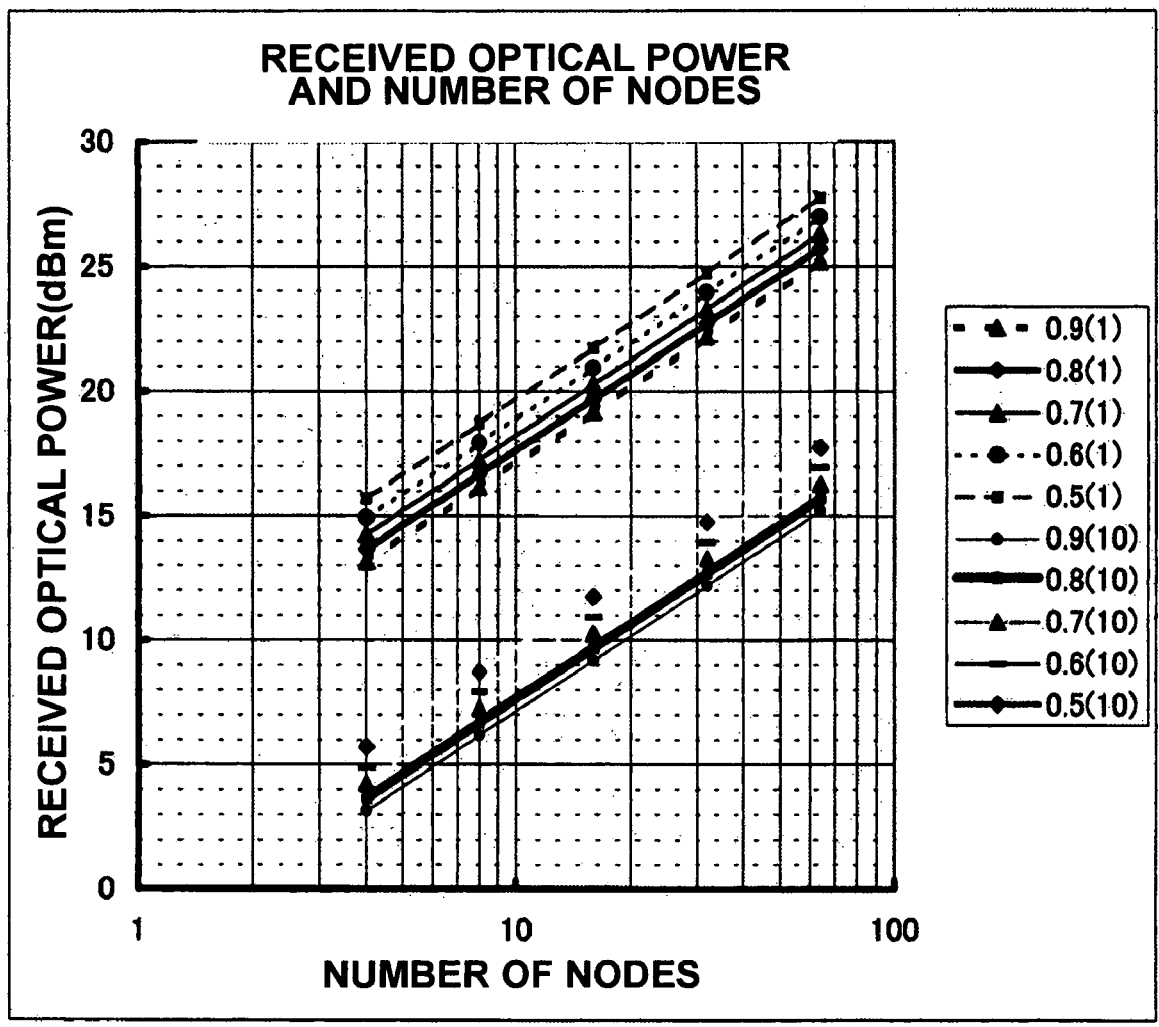
FIG. 11 is a graph showing the relationship between received optical power and number of nodes in a communication system using the sheet-shaped light guide.
Figure 12:
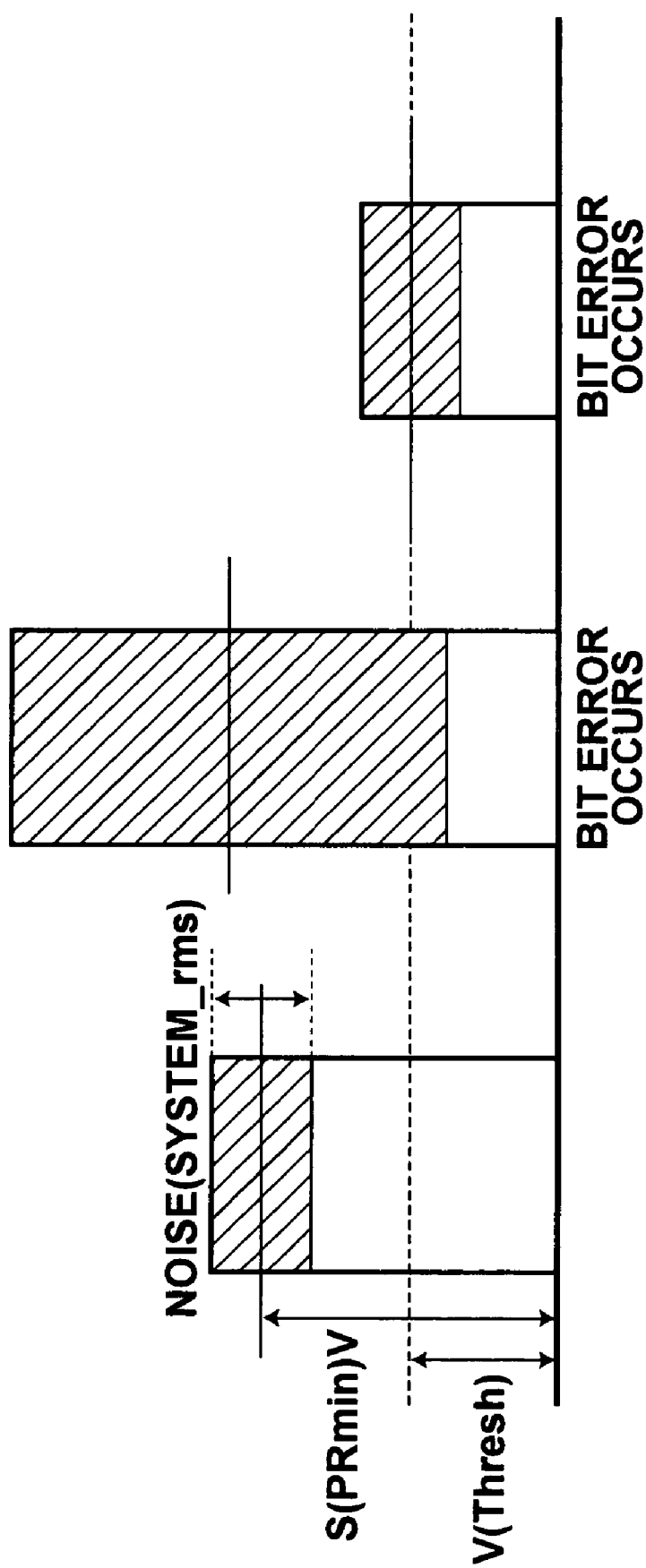
FIG. 12 is an explanatory diagram for explaining an occurrence cause of a bit error.
Figure 13A:
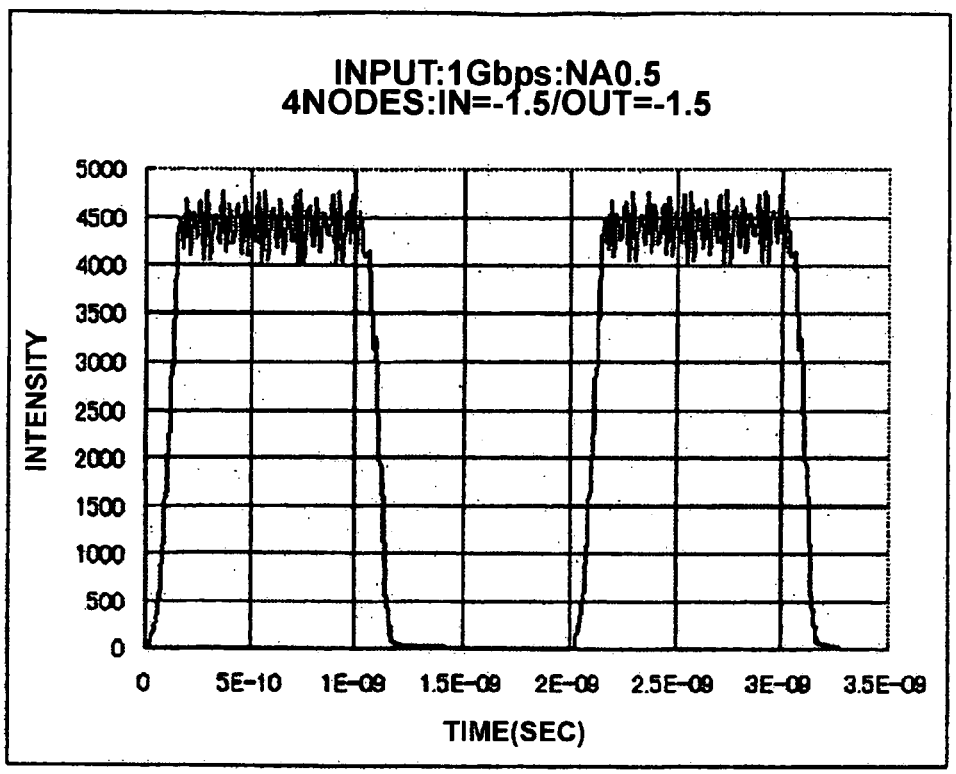
FIG. 13A is a graph showing an example of waveform distortion of signal light in a communication system using the sheet-shaped light guide, the number of nodes of which is four.
Figure 13B:
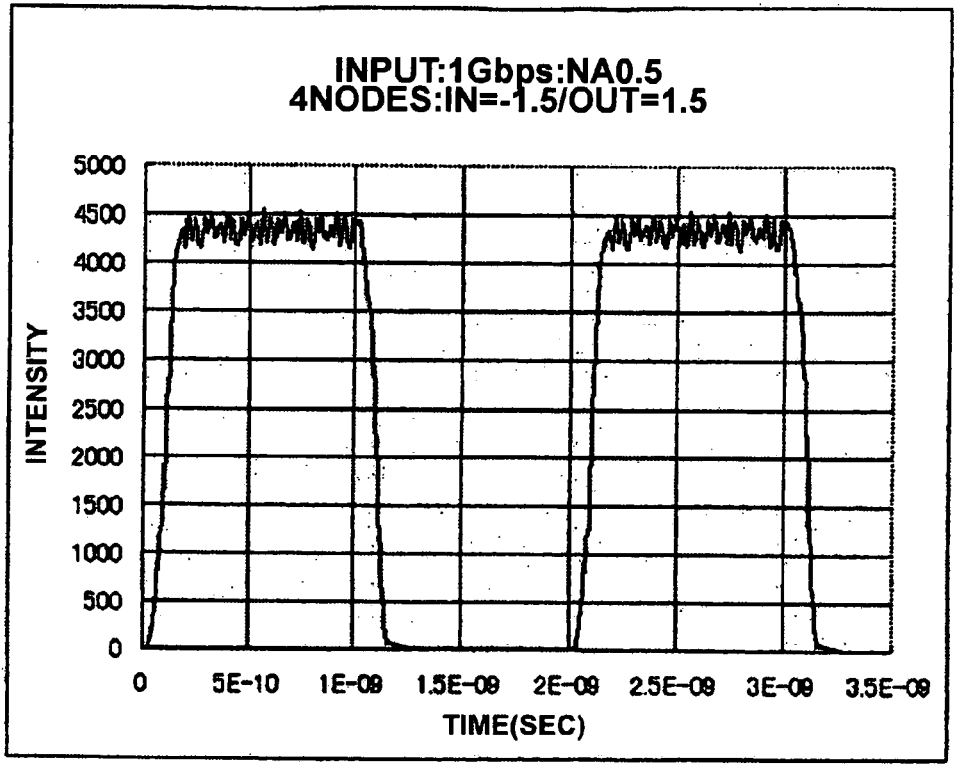
FIG. 13B is a graph showing another example of waveform distortion of signal light in the communication system using the sheet-shaped light guide, the number of nodes of which is four.
Figure 14A:
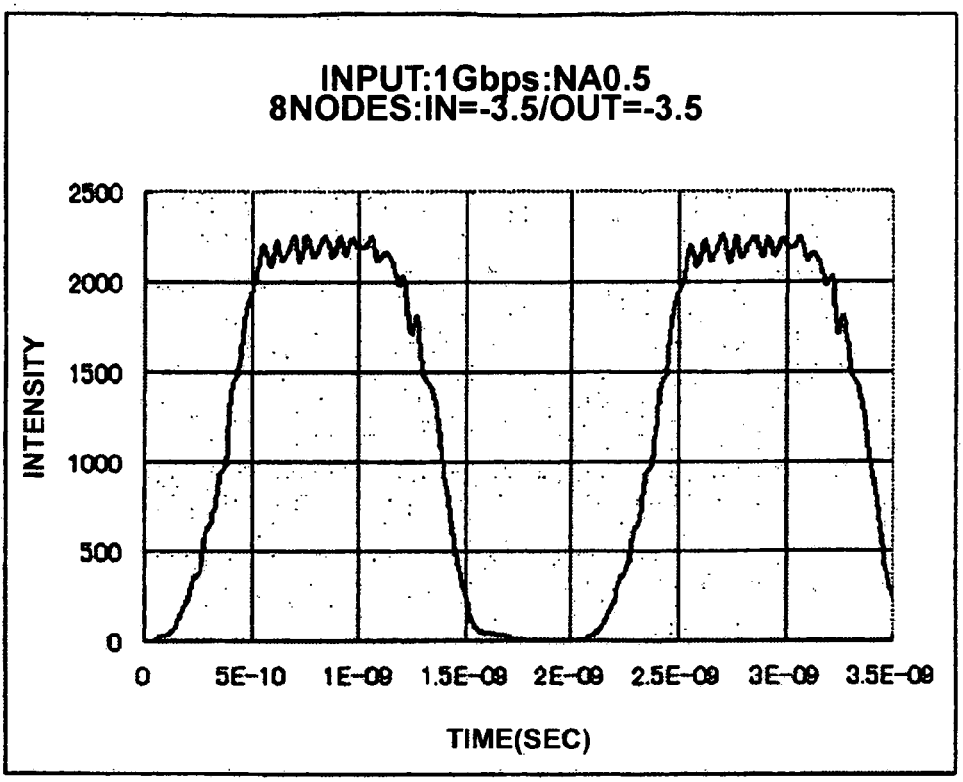
FIG. 14A is a graph showing an example of waveform distortion of signal light in a communication system using the sheet-shaped light guide, the number of nodes of which is eight.
Figure 14B:
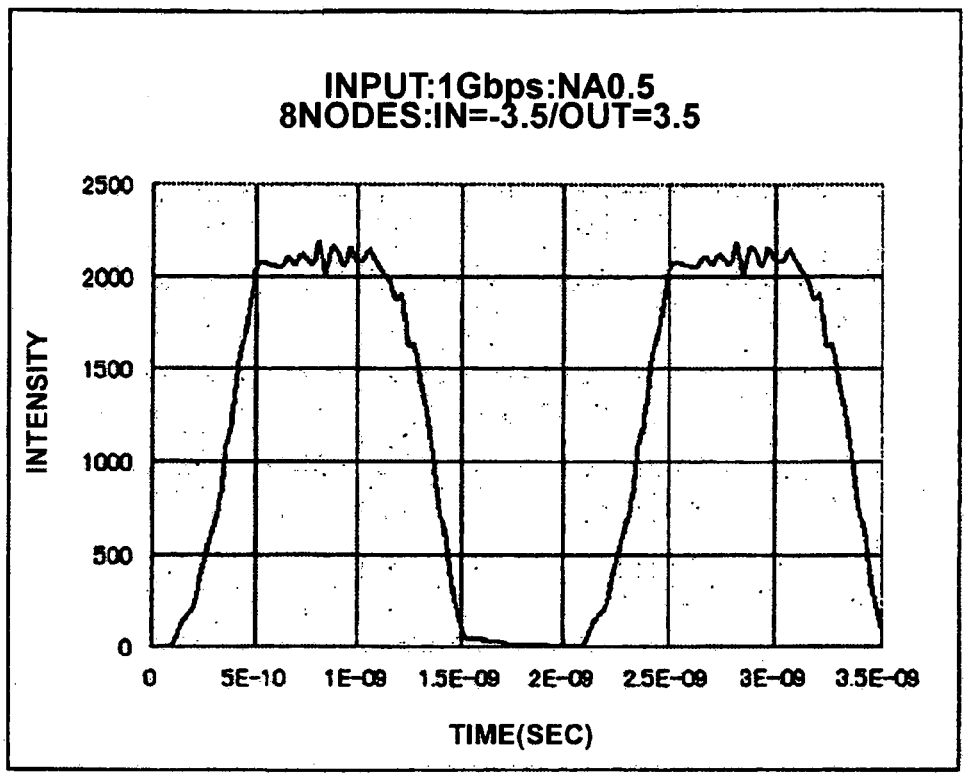
FIG. 14B is a graph showing another example of waveform distortion of signal light in the communication system using the sheet-shaped light guide, the number of nodes of which is eight.
Figure 15A:
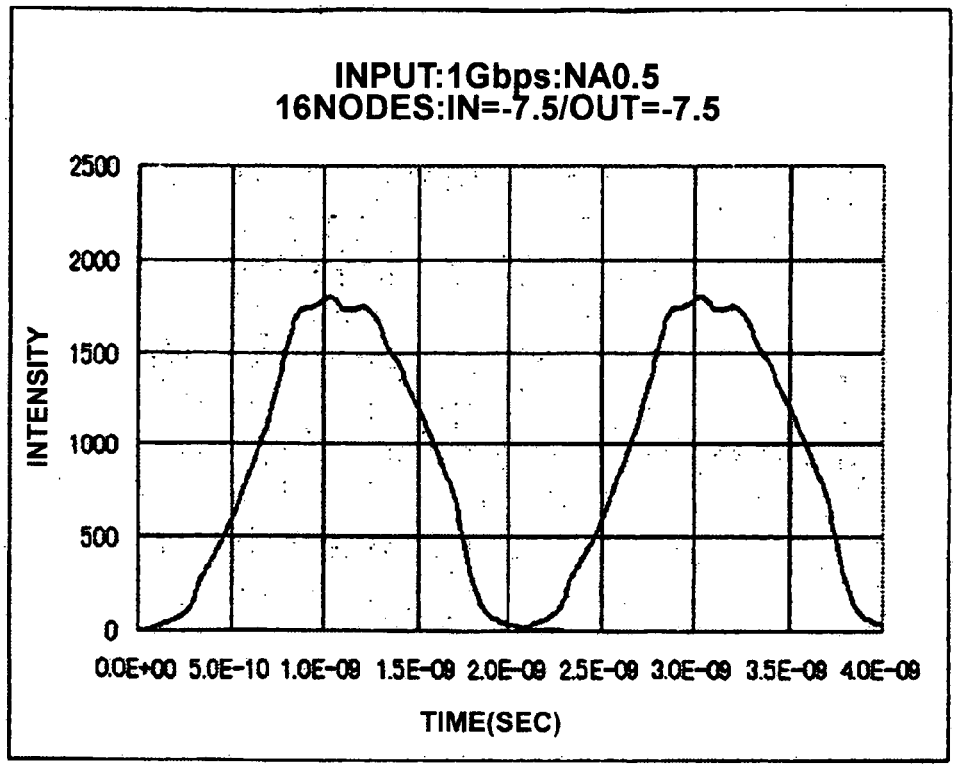
FIG. 15A is a graph showing an example of waveform distortion of signal light in a communication system using the sheet-shaped light guide, the number of nodes of which is 16.
Figure 15B:
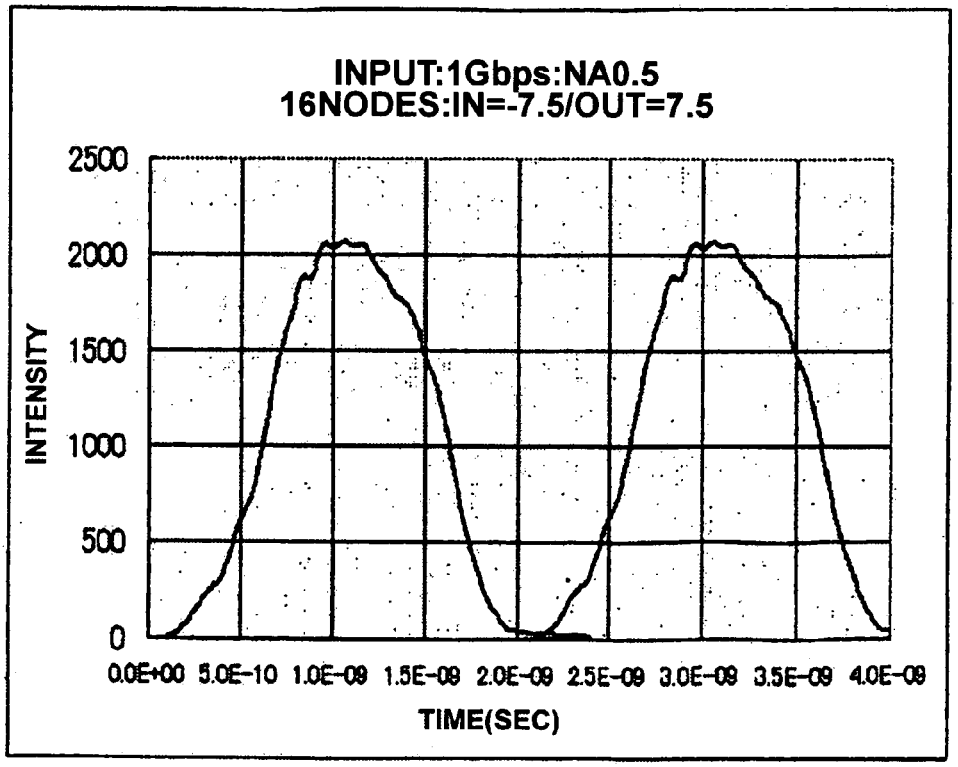
FIG. 15B is a graph showing another example of waveform distortion of signal light in the communication system using the sheet-shaped light guide, the number of nodes of which is 16.
Figure 16:
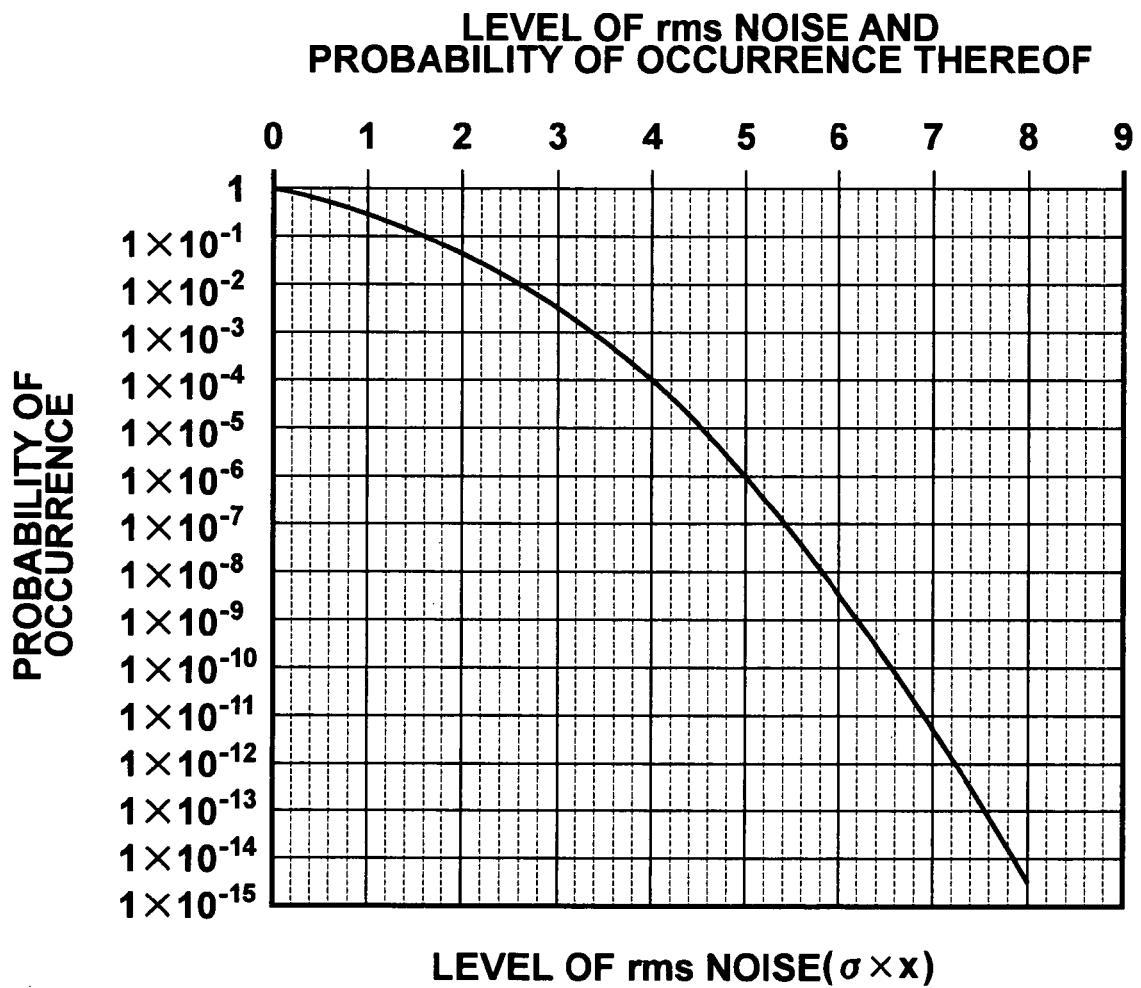
FIG. 16 is a graph showing the relationship between level of root mean square (rms) noise and probability of occurrence thereof.
Figure 17:
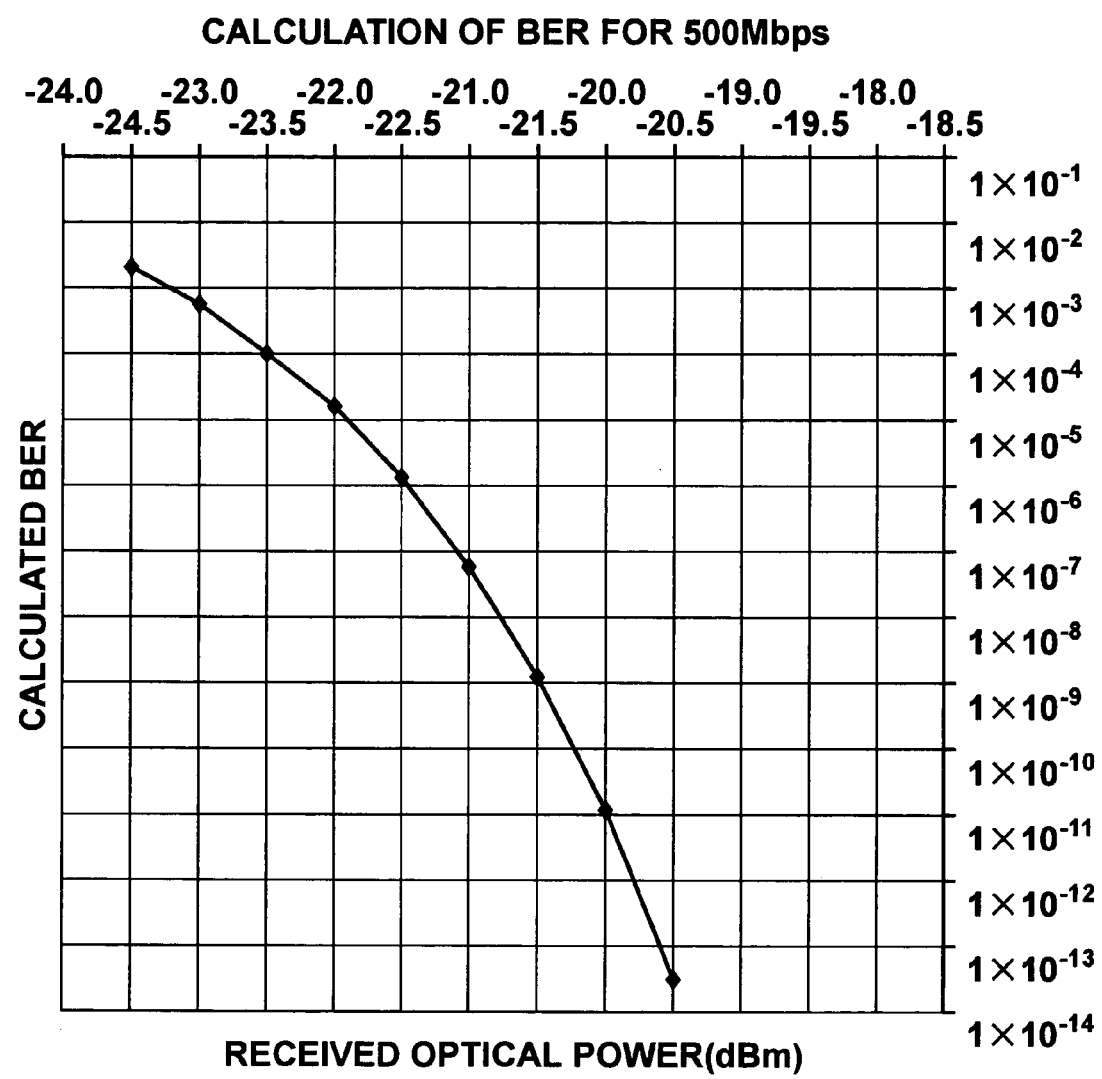
FIG. 17 is a graph showing the relationship between Bit-Error-Rate (BER) and received optical power.
Figure 18:
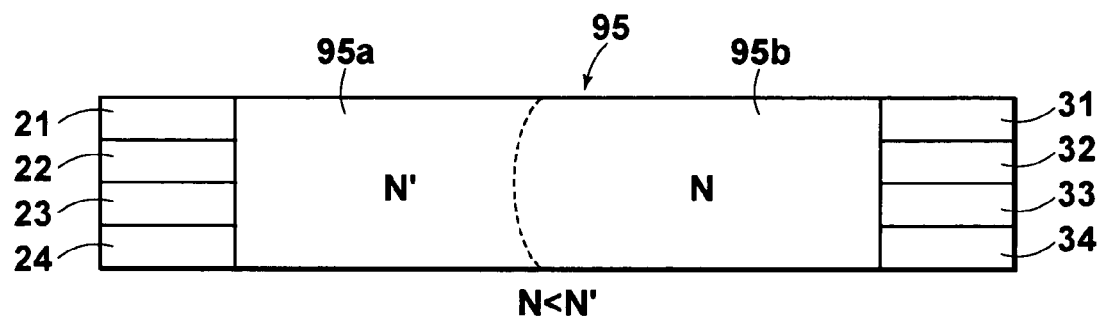
FIG. 18 is a plan view showing a communication system according to an embodiment of the present invention.

FIG. 18 is a plan view of a communication system using a sheet-shaped light guide according to an embodiment of the present invention. As illustrated, this system is that of a four-node type formed by joining four optical fibers 21 to 24 as an example to one end face of one sheet-shaped light guide 95 and joining four optical fibers 31 to 34 also to the other end face. The sheet-shaped light guide 95 is one formed to have a thickness of 1 mm, a width of 4 mm, and a length of 30 mm.

As described above, the sheet-shaped light guide 95 includes the light-scattering particles in the optical medium such as, for example, polymethylmethacrylate (PMMA) and propagates the light incident from the one end face to the other end face side while scattering the light by means of the particles.

For example, signal light emitted from a light emitter (not shown) coupled to one of the optical fibers 21 to 24 on the left side of the drawing propagates through the optical fiber concerned and the sheet-shaped light guide 95, and is received in parallel, for example, by light receivers (not shown) coupled to three of the optical fibers 31 to 34. To the remaining one of the optical fibers 31 to 34, a light emitter similar to the above-described one is coupled, thus enabling a two-way communication.

The sheet-shaped light guide 95 includes a high-refractive-index portion 95a and a low-refractive-index portion 95b, in which refractive indexes of the optical mediums are N' and N, respectively, the refractive indexes being different from each other (N<N'). Moreover, in a plane parallel to a sheet face, an interface between these high-refractive-index portion 95a and low-refractive-index portion 95b is formed into a circular arc shape where the former (high-refractive-index portion 95a) becomes concave. Therefore, the sheet-shaped light guide 95 becomes that which has a concave lens effect of diffusing the light propagating therethrough in the above-described plane.

When the sheet-shaped light guide 95 having such a concave lens effect is used, it is made possible to make an intensity distribution of the light emitted from the sheet-shaped light guide 95 more highly even in comparison with the case of only scattering the light by the above-described particles. Accordingly, variations in optical power among the plurality of nodes are restricted to be small, thus making it possible to substantially equalize Bit-Error-Rates (BERs) of the nodes to one another.

Figure 19:
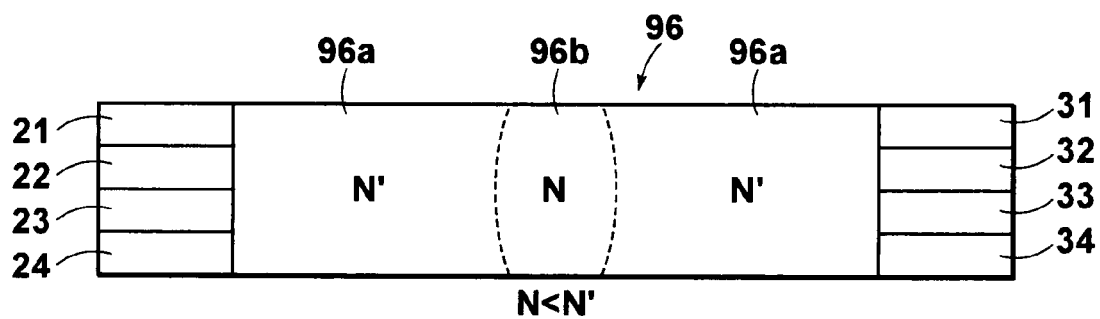
FIG. 19 is a plan view showing a communication system according to another embodiment of the present invention.

Note that the lens shape in the sheet-shaped light guide is not limited to the shape shown in FIG. 18, and the other shapes, such as a shape shown in FIG. 19, can be employed. Specifically, a sheet-shaped light guide 96, the plan shape of which is shown in FIG. 19, is that which is formed by arranging high-refractive-index portions 96a (refractive index=N'), each of which is formed into a concave shape with respect to one low-refractive-index portion 96b (refractive index=N, N<N'), on both sides of the low-refractive-index portion 96b. With this configuration also, the concave lens effect of diffusing the propagating light can be obtained.

Figure 20:
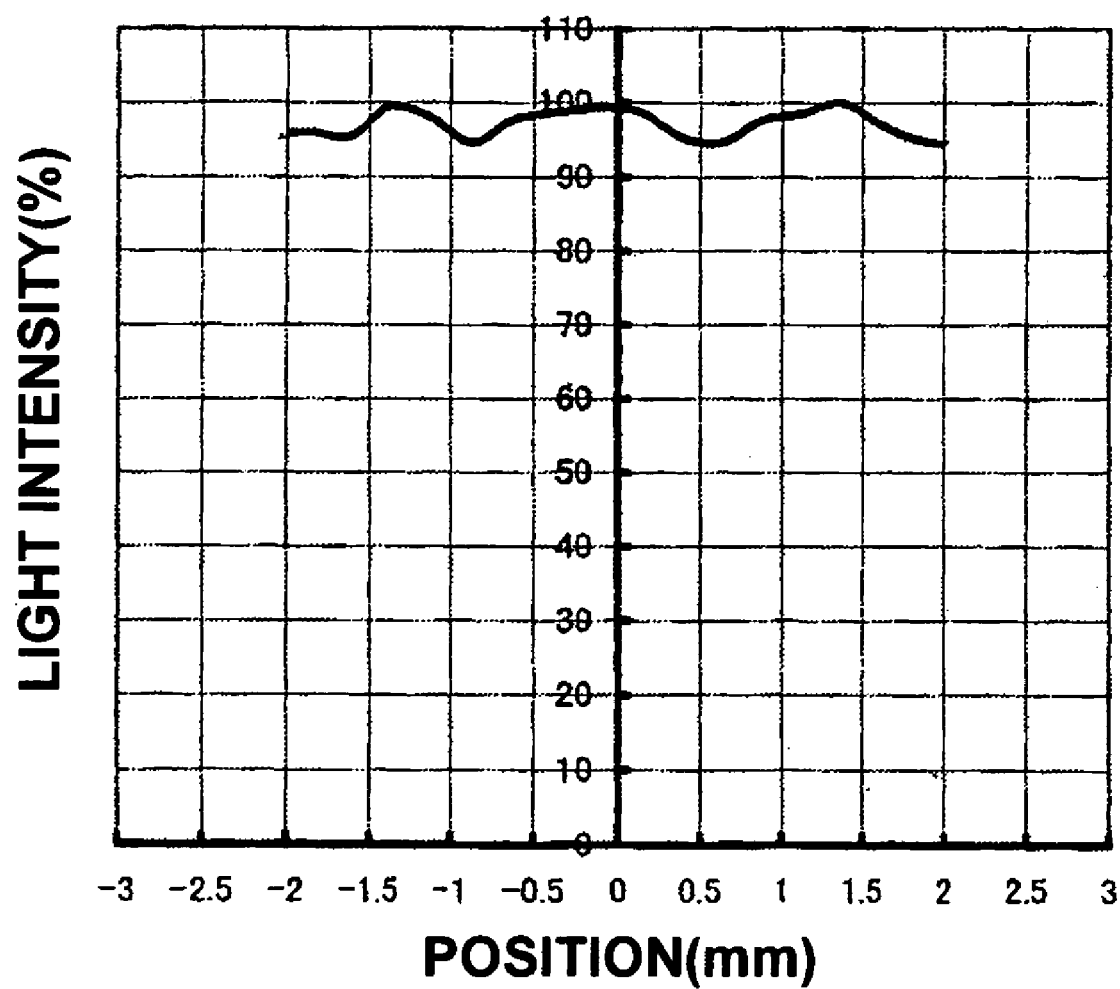
FIG. 20 is a graph for explaining an effect obtained by the sheet-shaped light guide of the present invention.

Here, FIG. 20 shows an example of a result of simulating, by a computer, the intensity distribution of the emitted light in a sheet width direction for the sheet-shaped light guide 96 having a configuration shown in FIG. 19. In this case, the sheet width is set at 4 mm, and numerical values on the horizontal axis represent the distance from a center position in the sheet width direction. From FIG. 20, it can be confirmed that the intensity distribution of the emitted light can be made highly even.

What is claimed is:

1. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light, wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less, and wherein, when rms noise of the system is Noise(System_rms), an acceptable bit error rate is BER(accept), and a probability of occurrence of the Noise(System_rms) is Pr(Noise(System_rms)), the communication system satisfies:

Pr(Noise(System_rms))·Q ≦ BER(accept)

where Q is a proportionality constant.

2. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light, wherein, in the interface, the optical medium whose refractive index is higher forms a concave shape toward the optical medium whose refractive index is lower, thus realizing the concave lens effect at the interface;

wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less, and wherein, when rms noise of the system is Noise(System_rms), an acceptable bit error rate is BER(accept), and a probability of occurrence of the Noise(System_rms) is Pr(Noise(System_rms)), the communication system satisfies:

Pr(Noise(System_rms)·Q)≦BER(accept)

where Q is a proportionality constant.

3. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light;

wherein, when a scattering cross section of the particles is $\Phi$, a length of the optical medium in a light propagation direction is $L_G$, particle density is Np, and a correction coefficient is $K_C$, a value of $\Phi \cdot Np \cdot L_G \cdot K_C$ is 0.9 or less, and wherein, when light emission efficiency Eout in the sheet-shaped light guide is represented as:

$Eout = \exp\{-(\Phi \cdot Np \cdot L_G \cdot K_C)\} \cdot K_L$, where $K_L$ is a loss coefficient obtained by aggregating internal transmissivity and the like of the sheet-shaped light guide, a minimum received optical power P(Receiver_min) dBm of a light receiver is represented as:

$P(Receiver\_min)_{dBm} = -10\text{Log}\{Pin \cdot Eout \cdot (NPi(min)/\Sigma NPi) \cdot \pi/4\} \cdot K_T$ where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and a signal voltage determined from the minimum received optical power $P(Receiver\_min)_{dBm}$ and a load resistor of a light receiver is S(PRmin)v, rms noise of the system is Noise(System_rms), and an arbitrary threshold value in binarization is V(Thresh), the communication system satisfies:

{S(PRmin)v−V(Thresh)}>Noise(System_rms)·Q.

4. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light, wherein, in the interface, the optical medium whose refractive index is higher forms a concave shape toward the optical medium whose refractive index is lower, thus realizing the concave lens effect at the interface;

wherein, when a scattering cross section of the particles is $\Phi$ a length of the optical medium in a light propagation direction is $L_G$, particle density is Np, and a correction coefficient is $K_C$, a value of $\Phi \cdot Np \cdot L_G \cdot K_C$ is 0.9 or less;

wherein, when light emission efficiency Eout in the sheet-shaped light guide is represented as:

$Eout = \exp\{-(\Phi \cdot Np \cdot L_G \cdot K_C)\} \cdot K_L$, where $K_L$ is a loss coefficient obtained by aggregating internal transmissivity and the like of the sheet-shaped light guide, a minimum received optical power P(Receiver_min) dBm of a light receiver is represented as:

$P(Receiver\_min)_{dBm} = -10\text{Log}\{Pin \cdot Eout \cdot (NPi(min)/\Sigma NPi) \cdot \pi/4\} \cdot K_T$ where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and a signal voltage determined from the minimum received optical power $P(Receiver\_min)_{dBm}$ and a load resistor of a light receiver is S(PRmin)v, rms noise of the system is Noise(System_rms), and an arbitrary threshold value in binarization is V(Thresh), the communication system satisfies:

{S(PRmin)v−V(Thresh)}>Noise(System_rms)·Q.

5. The communication system using the sheet-shaped light guide according to claim 1, wherein, when light emission efficiency Eout in the sheet-shaped light guide is represented as:

$Eout = \exp\{-(\Phi \cdot Np \cdot L_G \cdot K_C)\} \cdot K_L$, where $K_L$ is a loss coefficient obtained by aggregating internal transmissivity and the like of the sheet-shaped light guide, a minimum received optical power $P(Receiver\_min)_{dBm}$ of a light receiver is represented as:

$P(Receiver\_min)_{dBm} = -10\text{Log}\{Pin \cdot Eout \cdot (NPi(min)/\Sigma NPi) \cdot \pi/4\} \cdot K_T$ where Pin is received optical power, NPi(min) is optical power of a segment in which optical power becomes minimum, $\Sigma NPi$ is a sum of the optical power of respective segments, and $K_T$ is a coupling loss between a light emitter, optical fibers, a light receiver and the like, and a signal voltage determined from the minimum received optical power $P(Receiver\_min)_{dBm}$ and a load resistor of a light receiver is S(PRmin)v, rms noise of the system is Noise(System_rms), and an arbitrary threshold value in binarization is V(Thresh), the communication system satisfies:

{S(PRmin)v−V(Thresh)}>Noise(System_rms)·Q.

6. The communication system using the sheet-shaped light guide according to claim 2, wherein, when light emission efficiency Eout in the sheet-shaped light guide is represented as:

$Eout = \exp\{-(\Phi \cdot Np \cdot L_G \cdot K_C)\} \cdot K_L$, where $K_L$ is a loss coefficient obtained by aggregating internal transmissivity and the like of the sheet-shaped light guide, a minimum received optical power $P(\text{Receiver\_min})_{dBm}$ of a light receiver is represented as:

$$P(\text{Receiver\_min})_{dBm} = -10\text{Log}\{Pin \cdot Eout \cdot (NPi(\min)/\Sigma NPi) \cdot \pi/4\} \cdot K_T$$

where Pin is received optical power, NPi(min) is optical power of a segment in which optical power becomes minimum, $\Sigma$NPi is a sum of the optical power of respective segments, and $K_T$ is a coupling loss between a light emitter, optical fibers, a light receiver and the like, and a signal voltage determined from the minimum received optical power $P(\text{Receiver\_min})_{dBm}$ and a load resistor of a light receiver is S(PRmin)v, rms noise of the system is Noise(System_rms), and an arbitrary threshold value in binarization is V(Thresh), the communication system satisfies:

$$\{S(PRmin)v - V(Thresh)\} > \text{Noise}(System\_rms) \cdot Q.$$

7. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light;

when rms noise of the system is Noise(System_rms), an acceptable bit error rate is BER(accept), and a probability of occurrence of the Noise(System_rms) is Pr(Noise(System_rms)), the communication system satisfies:

$$\text{Pr}(\text{Noise}(System\_rms) \cdot Q) \leq BER(accept)$$

where Q is a proportionality constant.

8. A sheet-shaped light guide, which includes particles for scattering light in a sheet-shaped optical medium and propagates signal light incident from one end face of the sheet-shaped light guide to the other end face side while scattering the signal light by the particles, wherein a plurality of optical mediums whose refractive indexes are different from each other are used as the optical medium, and an interface between the optical mediums is formed into a curved shape, and has a concave lens effect for the signal light;

wherein, when light emission efficiency Eout in the sheet-shaped light guide is represented as:

$$Eout = \exp\{-(\Phi \cdot Np \cdot L_G \cdot K_C)\} \cdot K_L,$$

where $K_L$ is a loss coefficient obtained by aggregating internal transmissivity and the like of the sheet-shaped light guide, a minimum received optical power P(Receiver_min)dBm of a light receiver is represented as:

$$P(\text{Receiver\_min})_{dBm} = -10\text{Log}\{Pin \cdot Eout(NPi(\min)/\Sigma NPi) \cdot \pi/4\}K_T$$

where Pin is received optical power, NPi(min) is optical power of a segment in which optical power becomes minimum, $\Sigma$NPi is a sum of the optical power of respective segments, and $K_T$ is a coupling loss between a light emitter, optical fibers, a light receiver and the like, and a signal voltage determined from the minimum received optical power $P(\text{Receiver\_min})_{dBm}$ and a load resistor of a light receiver is S(PRmin)v, rms noise of the system is Noise(System_rms), and an arbitrary threshold value in binarization is V(Thresh), the communication system satisfies:

$$\{S(PRmin)v - V(Thresh)\} > \text{Noise}(System\_rms) \cdot Q.$$

* * * * *